United States Patent
Momose et al.

(10) Patent No.: US 10,446,850 B2
(45) Date of Patent: Oct. 15, 2019

(54) BINDER RESIN COMPOSITION FOR SECONDARY BATTERY ELECTRODES, SLURRY FOR SECONDARY BATTERY ELECTRODES, ELECTRODE FOR SECONDARY BATTERIES, AND LITHIUM ION SECONDARY BATTERY

(71) Applicant: Mitsubishi Chemical Corporation, Tokyo (JP)

(72) Inventors: Fumino Momose, Otake (JP); Haruki Okada, Otake (JP); Ayako Shimonaka, Otake (JP); Mitsufumi Nodono, Otake (JP); Daisuke Fujikawa, Otake (JP); Hikaru Momose, Otake (JP); Akihiro Ishii, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/371,115

(22) PCT Filed: Jan. 11, 2013

(86) PCT No.: PCT/JP2013/050358
§ 371 (c)(1),
(2) Date: Jul. 8, 2014

(87) PCT Pub. No.: WO2013/105623
PCT Pub. Date: Jul. 18, 2013

(65) Prior Publication Data
US 2014/0349185 A1 Nov. 27, 2014

(30) Foreign Application Priority Data

Jan. 11, 2012 (JP) ................................. 2012-003209
Jan. 17, 2012 (JP) ................................. 2012-007441

(51) Int. Cl.
| | | |
|---|---|---|
| H01M 4/62 | (2006.01) | |
| H01M 4/04 | (2006.01) | |
| H01M 4/13 | (2010.01) | |
| H01M 4/139 | (2010.01) | |
| H01M 10/0525 | (2010.01) | |
| H01M 4/02 | (2006.01) | |

(52) U.S. Cl.
CPC ......... *H01M 4/622* (2013.01); *H01M 4/0404* (2013.01); *H01M 4/13* (2013.01); *H01M 4/139* (2013.01); *H01M 4/623* (2013.01); H01M 10/0525 (2013.01); H01M 2004/021 (2013.01)

(58) Field of Classification Search
CPC .................................................. H01M 4/622
See application file for complete search history.

(56) References Cited

U.S. PATENT DOCUMENTS

| 5,869,208 | A | * | 2/1999 | Miyasaka | ............. | H01M 4/131 |
| | | | | | | 429/215 |
| 6,335,119 | B1 | * | 1/2002 | Maruta | ................. | C01G 51/42 |
| | | | | | | 29/623.1 |
| 6,455,195 | B1 | | 9/2002 | Matsuura et al. | | |
| 2003/0118904 | A1 | * | 6/2003 | Hosokawa | ............. | H01M 4/13 |
| | | | | | | 429/217 |
| 2004/0016638 | A1 | * | 1/2004 | LaConti | ................... | C25B 9/04 |
| | | | | | | 204/252 |
| 2004/0048154 | A1 | | 3/2004 | Jung et al. | | |
| 2006/0014076 | A1 | * | 1/2006 | Donoue | ............. | H01M 4/5825 |
| | | | | | | 429/217 |
| 2007/0244003 | A1 | * | 10/2007 | Majima | ................... | B01J 23/42 |
| | | | | | | 502/319 |

(Continued)

FOREIGN PATENT DOCUMENTS

| JP | 11-067213 A | | 3/1999 |
| JP | 2000058060 A | * | 2/2000 |

(Continued)

OTHER PUBLICATIONS

JP2000058060translation.*

(Continued)

*Primary Examiner* — Sarah A. Slifka
*Assistant Examiner* — Brian R Ohara
(74) *Attorney, Agent, or Firm* — Morgan, Lewis & Bockius LLP

(57) ABSTRACT

A binder resin composition for secondary battery electrodes is described as containing a polymer (A) that has a structural unit represented by general formula (1) and a water-insoluble particulate polymer (B-1) and/or a water-soluble polymer (B-2) where (A), (B-1) and (B-2) are defined as described. A slurry for secondary battery electrodes contains the binder resin composition, an active material and a solvent. An electrode for secondary batteries is provided with a collector and an electrode layer that is arranged on the collector, where the electrode layer contains an active material and the binder resin composition. Alternatively, the electrode layer is obtained by applying the slurry for secondary battery electrodes to the collector, and drying the slurry thereon.

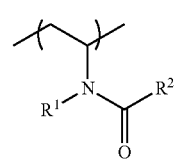

(1)

12 Claims, No Drawings

(56) References Cited

U.S. PATENT DOCUMENTS

| | | | | |
|---|---|---|---|---|
| 2008/0187838 A1* | 8/2008 | Le | .................. | H01M 4/134 |
| | | | | 429/231.95 |
| 2011/0059372 A1* | 3/2011 | Chiga | .................. | H01M 4/131 |
| | | | | 429/346 |

FOREIGN PATENT DOCUMENTS

| | | | |
|---|---|---|---|
| JP | 2002-117860 A | 4/2002 | |
| JP | 2002-251999 A | 9/2002 | |
| JP | 2002-279980 A | 9/2002 | |
| JP | 2010-061996 A | 3/2010 | |
| JP | 2010-061997 A | 3/2010 | |

OTHER PUBLICATIONS

International Search Report issued in corresponding International Patent Application No. PCT/JP2013/050358 dated Mar. 5, 2013.
European Search Report issued by the European Patent Office dated May 18, 2015 in the corresponding European Patent Application No. 13736240.6.

* cited by examiner

BINDER RESIN COMPOSITION FOR SECONDARY BATTERY ELECTRODES, SLURRY FOR SECONDARY BATTERY ELECTRODES, ELECTRODE FOR SECONDARY BATTERIES, AND LITHIUM ION SECONDARY BATTERY

TECHNICAL FIELD

The present invention relates to a binder resin composition for secondary battery electrodes, a slurry for secondary battery electrodes, an electrode for secondary batteries, and a lithium ion secondary battery.

The present application claims priority based on Patent Application No. 2012-3209 filed in Japan on Jan. 11, 2012 and Patent Application No. 2012-7441 filed in Japan on Jan. 17, 2012, and the contents thereof are incorporated herein by reference.

BACKGROUND ART

Recent years, lithium ion secondary batteries are used for electric accumulators of portable machines such as cellphones, video camcorders and notebook computers, hybrid cars, and battery cars.

The lithium ion secondary batteries are typically obtained by mixing a mixture, where a substance of a powdery electrode active material (active material) has been mixed with an appropriate amount of a binding agent (binder), with a solvent to prepare a slurry for electrodes, and coating and drying it on a current collector followed by pressure-bonding to thereby form an electrode layer.

As for the binder, a material is used that satisfies solvent resistance to organic solvents used for electrolyte solution of secondary batteries, oxidation or reduction resistance in a drive voltage, etc. Polyvinylidene fluoride (hereinafter abbreviated as "PVDF") etc. are used as such a material.

On the other hand, nitrogen-containing organic solvents such as amides including N-methyl-2-pyrolidone (hereinafter abbreviated as "NMP") and ureas are used as a solvent to make the mixture of active materials, binders, etc. into a slurry.

However, there were problems with the nitrogen-containing organic solvents including NMP in that cost for collecting the solvents and environmental load are high, etc. Since NMP has a boiling point as high as 204° C., there was also a problem in that considerable energy is required when drying or collecting and purifying the solvents, for example.

In view of these problems, it has been investigated that a nonionic water-soluble polymer is used as a binder and dissolved or dispersed in water to prepare a slurry for electrodes to thereby produce an electrode.

For example, Patent Document 1 discloses a binding agent that contains carboxymethyl cellulose and a polymer latex. The binding agent containing carboxymethyl cellulose and a polymer latex is excellent in dispersion stability and coating ability, and thus electrode layers with good adhesiveness to current collectors can be obtained.

However, since carboxymethyl cellulose is derived from a natural product, there were problems in that quality thereof is less likely to be consistent between lots supplied, storage stability is poor, etc.

Alternatively, a polymer having an N-vinylacetamide unit has been reported as a water-soluble binder of non-natural derived product.

For example, Patent Document 2 discloses a positive electrode paste for nonaqueous batteries that contains poly (N-vinylacetamide) as a polymer containing a repeating structural unit with an amide structure. The poly(N-vinylacetamide) can allegedly improve required performance of secondary batteries (nonaqueous secondary batteries in particular) such as paste stability, binding ability and electrochemical stability.

Furthermore, Patent Document 3 discloses a resin component that contains as a binder poly(N-vinylacetamide) and a copolymer between ethylene oxide (EO) and propylene oxide (PO). The binder can allegedly provide excellent binding ability and battery properties under environment from low temperature to room temperature.

[Patent Document 1] Japanese Unexamined Patent Application, Publication No. H11-67213

[Patent Document 2] Japanese Unexamined Patent Application, Publication No. 2002-251999

[Patent Document 3] Japanese Unexamined Patent Application, Publication No. 2002-117860

DISCLOSURE OF THE INVENTION

Problems to be Solved by the Invention

However, electrodes using as a binder the poly(N-vinylacetamide) formed exclusively of a repeating structural unit with an amide structure as described in Patent Document 2 were poor in flexibility (ductility). Particularly, when the poly(N-vinylacetamide) was used as a binder for negative electrodes, stability of slurries for electrodes (slurry stability) and battery properties of resulting batteries were likely to degrade.

Furthermore, since the binder described in Patent Document 3 is of a molecular structure where EO or PO chain is similar to that of the composition of electrolyte solution, there were fears in that the molecular volume of the copolymer of EO and PO swells when dipping electrodes into the electrolyte solution to thereby degrade binding ability, discharged capacity cannot be maintained at a high level for a long time (degradation of cycle property) due to drop-off of active materials to thereby degrade battery performance, etc.

Incidentally, in conventional compositions of electrode layers, a conductive auxiliary agent such as acetylene black is often added to positive electrodes in order to impart conductivity, in addition to active materials and binders. The conductive auxiliary agent also provides an effect to impart thixotropy to the slurry for electrodes due to its small particle diameter. For this reason, the slurry for electrodes of positive electrodes (slurry for positive electrodes) is less likely to generate sedimentation of active materials etc. under a static condition and thus temporal stability of the slurry is high.

On the other hand, since a large amount of carbonaceous substance is used as active materials in negative electrodes and thus conductivity is ensured, such a conductive auxiliary agent is not added in many cases. For this reason, the slurry for electrodes of negative electrodes (slurry for negative electrodes) exhibits low thixotropy, thus active materials tend to rapidly settle out under a static condition and stability thereof is bad. When the slurry for negative electrodes is coated on current collectors, the active materials settle out until dried out and thus the binder becomes nonuniformly distributed on the upper side, thereby causing a problem in that battery properties in particular long-term cycle property are poor.

The present invention has been made in view of the circumstances described above; and it is an object of the present invention to provide a binder resin composition for secondary battery electrodes which allows to form electrodes excellent in flexibility and to obtain batteries excellent in battery properties in particular long-term cycle property and also is excellent in binding ability, a slurry for secondary battery electrodes, an electrode for secondary batteries, and a lithium ion secondary battery equipped therewith.

It is also an object of the present invention to provide a binder resin composition for secondary battery electrodes which allows to obtain slurries for electrodes excellent in stability even when used for negative electrodes, to form electrodes in which nonuniform distribution of active materials and binders is suppressed, and to obtain batteries excellent in battery properties in particular long-term cycle property, a slurry for secondary battery electrodes, an electrode for secondary batteries, and a lithium ion secondary battery equipped therewith.

Means for Solving the Problems

The present inventors have thoroughly investigated; as a result, it has been found that binding ability can be improved, and electrodes excellent in flexibility can be formed, and also batteries excellent in battery properties can be obtained by way of using as a binder a polymer having an amide structural unit and a water-insoluble particulate polymer in combination, thereby completing the present invention.

Furthermore, the present inventors have thoroughly investigated; as a result, it has also been found that a highly stable slurry can be obtained even when preparing a viscosity-increase resistant slurry for negative electrodes, and an electrode with less nonuniform distribution of active materials and binders can be formed, and also a battery excellent in battery properties can be obtained, by way of using in combination as a binder a polymer having an amide structural unit and a water-soluble polymer (high-molecular substance) having an acidic group and/or a salt thereof, thereby completing the present invention.

The present invention has the following embodiments.

A first aspect of the present invention is a binder resin composition for secondary battery electrodes, including a polymer (A) having a structural unit represented by the general formula (1) below and a water-insoluble particulate polymer (B-1) and/or a water-soluble polymer (B-2), in which the polymer (B-2) has an acidic group and/or a salt thereof;

[Chem. 1]

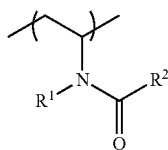
(1)

in the formula (1), $R^1$ and $R^2$ are each independently a hydrogen atom or an alkyl group.

A second aspect of the present invention is a binder resin composition for secondary battery electrodes according to the first aspect, in which an average particle diameter of the polymer (B-1) is from 10 to 1000 nm.

A third aspect of the present invention is a binder resin composition for secondary battery electrodes according to the first or second aspect, in which a mass ratio of the polymer (A) to the polymer (B-1), (polymer (A))/(polymer (B-1)), is from 5/95 to 95/5.

A fourth aspect of the present invention is a binder resin composition for secondary battery electrodes according to any one of the first to third aspects, in which an electrode layer undergoes no change in evaluating flexibility of an electrode by the flexibility test below.

(Flexibility Test)

The binder resin composition for secondary battery electrodes and water are kneaded. An active material is added thereto and kneaded, and a conductive auxiliary agent is further added and kneaded in a case that the electrode is positive, and which is then adjusted to a coatable viscosity with water, thereby obtaining a slurry for electrodes. The amounts compounded are 2 parts by mass of the binder resin composition for secondary battery electrodes and 5 parts by mass of the conductive auxiliary agent based on 100 parts by mass of the active material.

The resulting slurry for electrodes is coated on a current collector and dried, thereby obtaining an electrode where an electrode layer of film thickness from 20 to 200 μm has been formed on the current collector.

The resulting electrode is cut out into 3 cm wide and 5 cm long to obtain a test piece.

A mandrel of 5 mm diameter is contacted to a current collector-facing surface of the resulting test piece and one side of the test piece is fixed by a tape, then the condition of the electrode layer is observed under the environment of a humidity of 10% or less in the state that the test piece is bent and the current collector-facing surface is positioned inside, thereby evaluating the flexibility of the electrode.

A fifth aspect of the present invention is a binder resin composition for secondary battery electrodes according to the first aspect, in which the acidic group and/or the salt thereof is at least one selected from the group consisting of carboxyl groups, salts of carboxyl groups, sulfonic acid groups, salts of sulfonic acid groups, phosphoric acid groups and salts of phosphoric acid groups.

A sixth aspect of the present invention is a binder resin composition for secondary battery electrodes according to the first or fifth aspect, in which a mass ratio of the polymer (A) to the polymer (B-2), (polymer (A))/(polymer (B-2)), is from 5/95 to 99.5/0.5.

A seventh aspect of the present invention is a binder resin composition for secondary battery electrodes according to the first, fifth or sixth aspect, in which a ratio (β/α) is at least 5 between a viscosity (α) of 1% by mass aqueous solution of the polymer (A) and a viscosity (β) of the solution where 10 parts by mass of the polymer (B-2) has been added to the aqueous solution based on 100 parts by mass of the polymer (A) therein.

An eighth aspect of the present invention is a slurry for secondary battery electrodes, including the binder resin composition for secondary battery electrodes according to any one of the first to seventh aspects, an active material, and a solvent.

A ninth aspect of the present invention is an electrode for secondary batteries, including a current collector and an electrode layer provided on the current collector, in which the electrode layer contains an active material and the binder resin composition for secondary battery electrodes according to any one of the first to seventh aspects.

A tenth aspect of the present invention is a lithium ion secondary battery, including the electrode for secondary batteries according to the ninth aspect.

An eleventh aspect of the present invention is an electrode for secondary batteries, including a current collector and an electrode layer provided on the current collector, in which the electrode layer is obtained by coating and drying the slurry for secondary battery electrodes according to the eighth aspect on the current collector.

A twelfth aspect of the present invention is a lithium ion secondary battery, including the electrode for secondary batteries according to the eleventh aspect.

Effects of the Invention

In accordance with the present invention, there can be provided a binder resin composition for secondary battery electrodes which allows to form electrodes excellent in flexibility and to obtain batteries excellent in battery properties in particular long-term cycle property and also is excellent in binding ability, a slurry for secondary battery electrodes, an electrode for secondary batteries, and a lithium ion secondary battery equipped therewith.

Furthermore, in accordance with the present invention, there can be provided a binder resin composition for secondary battery electrodes which allows to obtain slurries for electrodes excellent in stability even when used for negative electrodes, to form electrodes in which nonuniform distribution of active materials and binders is suppressed, and to obtain batteries excellent in battery properties in particular long-term cycle property, a slurry for secondary battery electrodes, an electrode for secondary batteries, and a lithium ion secondary battery equipped therewith.

PREFERRED MODE FOR CARRYING OUT THE INVENTION

Hereinafter, the present invention is explained in detail.

First Embodiment

<Binder Resin Composition for Secondary Battery Electrodes>

The binder resin composition for secondary battery electrodes (hereinafter referred to as "resin composition") in the first embodiment of the present invention contains the polymer (A) and the polymer (B-1) shown below.
(Polymer (A))

The polymer (A) is a polymer containing a structural unit represented by the general formula (1) below and a component that imparts binding ability to the resin composition.

[Chem. 2]

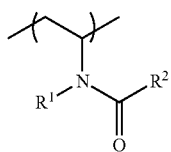

(1)

In the formula (1), $R^1$ and $R^2$ are each independently a hydrogen atom or an alkyl group.

The alkyl group is preferably a linear or branched alkyl group having 1 to 5 carbon atoms and may be exemplified by methyl group, ethyl group, n-propyl group, iso-propyl group, n-butyl group, sec-butyl group, tert-butyl group, n-pentyl group, 1-methylbutyl group, 2-methylbutyl group, 3-methylbutyl group, 1-ethylpropyl group, 1,1-dimethylpropyl group, 1,2-dimethylpropyl group, 2,2-dimethylpropyl group, etc.

Preferably, $R^1$ and $R^2$ are each independently a hydrogen atom or a methyl group from the viewpoint of solubility, viscosity properties and oxidation stability of the resulting polymer (A).

When the total of entire constitutional units constituting the polymer (A) is considered as 100% by mol, the content of the structural unit represented by the general formula (1) in the polymer (A) is preferably from 1% to 100% by mol and more preferably from 60% to 100% by mol. Particularly, in cases where the content of the structural unit represented by the general formula (1) is at least 60% by mol, water solubility and thickening ability of the resulting polymer (A) are enhanced. Furthermore, as the content of the structural unit represented by the general formula (1) becomes larger, binding ability of the electrode layer to current collectors tends to become higher; when it is 100% by mol in particular, strong binding ability is exhibited to current collectors.

The monomer to be the deriving source of the structural unit represented by the general formula (1) (hereinafter referred to as "monomer (a)") may be exemplified by N-vinylformamide, N-vinylacetamide, etc.

The polymer (A) may contain a unit (optional unit) other than the structural unit represented by the general formula (1) as necessary. By way of including the optional unit, mechanical properties such as stiffness and bending strength of the electrode layer described later may be improved.

The monomer to be the deriving source of the optional unit (hereinafter referred to as "optional monomer (a)") is not particularly limited as long as it is copolymerizable with the monomer (a) and may be exemplified by vinyl cyanide monomers such as acrylonitrile, methacrylonitrile, α-cyanoacrylate, dicyanovinylidene and fumaronitrile; (meth)acrylates such as methyl(meth)acrylate, ethyl(meth)acrylate, propyl(meth)acrylate, butyl(meth)acrylate and hexyl(meth)acrylate; carboxyl group-containing monomers such as (meth)acrylic acid, itaconic acid, crotonic acid, maleic acid and maleic anhydride, and salts thereof; aromatic vinyl monomers such as styrene and α-methyl styrene; maleimides such as maleimide and phenylmaleimide; sulfonic acid group-containing vinyl monomers such as (meth)allylsulfonic acid, (meth)allyloxybenzene sulfonic acid, styrenesulfonic acid and 2-acrylamido-2-methylpropanesulfonic acid, and salts thereof; phosphoric acid group-containing vinyl monomers such as 2-(meth)acryloyloxyethyl acid phosphate, monoethanol amine salt of 2-(meth)acryloyloxyethyl acid phosphate, diphenyl((meth)acryloyloxyethyl)phosphate, (meth)acryloyloxypropyl acid phosphate, 3-chloro-2-acid phosphoxypropyl(meth)acrylate, acid phosphoxy polyoxyethylene glycol mono(meth)acrylate and acid phosphoxy polyoxypropylene glycol (meth)acrylate, and salts thereof; ternary salts or quaternary ammonium salts of dimethylaminoethyl (meth)acrylate or dimethylaminopropyl (meth)acrylic amide; (meth)acrylic amide, vinyl acetate, N-vinylpyrrolidone, etc.

These optional monomers may be used alone or in a combination of two or more.

The mass average molecular mass of the polymer (A) is preferably from 5,000 to 10,000,000 and more preferably from 10,000 to 7,500,000. The polymer (A) with the mass average molecular mass within this range exhibits sufficient solubility in water and thus can rapidly dissolve in water and provide a sufficient thickening effect. Here, even when the mass average molecular mass is higher than 10,000,000, the thickening effect will hit a peak.

The mass average molecular mass of the polymer (A) can be measured using gel permeation chromatography (GPC). For example, it can be determined for a molecular mass as converted to polystyrene using a solvent such as tetrahydrofuran and water as an eluting solution.

Furthermore, the viscosity average molecular mass of the polymer (A) is preferably from 10,000 to 10,000,000 and more preferably from 100,000 to 8,000,000. When the viscosity average molecular mass of the polymer (A) is at least the lower limit, binding ability may be higher, and when it is no greater than the upper limit, water solubility may be high and also dispersibility of conductive auxiliary agent may be good.

The viscosity average molecular mass of the polymer (A) is calculated from the viscosity of an aqueous solution of the polymer (A) as a molecular mass converted from a viscosity using poly(N-vinylformamide) (hereinafter referred to as "PNVF") as a standard substance. An example of a method for calculating the viscosity average molecular mass is shown below.

Calculation Method of Viscosity Average Molecular Mass:

An inherent viscosity $[\eta]$ is calculated from a reduced viscosity ($\eta sp/C$) of an aqueous solution of the polymer (A) and Huggins equation ($\eta sp/C=[\eta]+K'[\eta]^2 C$). Here, "C" in the equation is a concentration (g/dL) of the polymer (A) in the aqueous solution of the polymer (A). The method for measuring the reduced viscosity of the aqueous solution of the polymer (A) is described later.

From the resulting inherent viscosity $[\eta]$ and Mark-Houwink equation ($[\eta]=KM^a$), the viscosity average molecular mass ("M" in the equation) is calculated.

Here, PNVF parameters are $K=8.31\times10^{-5}$, $a=0.76$ and $K'=0.31$ in 1 N sodium chloride solution.

Measuring Method of Reduced Viscosity:

Initially, the polymer (A) is dissolved in 1 N sodium chloride solution so that the concentration of the polymer (A) is 0.1% by mass, thereby obtaining an aqueous solution of the polymer (A). The resulting aqueous solution of the polymer (A) is measured for a flow time ($t_1$) at 25° C. using an Oswald viscometer.

Separately, as a blank, the 1 N sodium chloride solution is measured for a flow time ($t_0$) at 25° C. using the Oswald viscometer.

From the resulting flow times, the reduced viscosity is calculated by the equation (i) below:

$$\eta sp/C=\{(t_1/t_0)-1\}/C \quad (i)$$

in the equation (i), "C" is a concentration (g/dL) of the polymer (A) in the aqueous solution of the polymer (A).

The polymer (A) can be obtained by polymerizing singly the above-mentioned monomer (a) or copolymerizing the monomer (a) and an optional monomer.

The polymerization method is not particularly limited; processes such as bulk polymerization, solution polymerization, suspension polymerization, emulsion polymerization and optical polymerization may be employed depending on the monomer used for raw material, solubility of the resulting polymer, etc.

The polymerization initiator used for polymerizing the polymer (A) is not particularly limited; radical polymerization initiators such as water-soluble azo compounds, organic peroxide, water-soluble inorganic peroxides and redox polymerization initiators may be used.

The water-soluble azo compound may be exemplified by 4,4'-azobis(4-cyanovaleric acid), 2,2'-bis(2-imidazolin-2-yl)[2,2'-azobis propane]dihydrochloride, 2,2'-bis(2-imidazolin-2-yl)[2,2'-azobis propane]disulfonate dehydrate, 2,2'-azobis(2-amidinopropane)dihydrochloride, 2,2'-azobis(2-(N-(2-carboxyethyl)amidino)propane), 2,2'-azobis(2-(2-imidazolin-2-yl)propane), 2,2'-azobis(2-methyl-N-(1,1-bis(hydroxymethyl)-2-hydroxyethyl)propionamide), 2,2'-azobis[N-(2-hydroxyethyl)-2-methylpropanamide], etc.

The organic peroxide is preferably a water-soluble peroxide and may be exemplified by tert-butylhydroperoxide, etc.

The water-soluble inorganic peroxide may be exemplified by persulfates such as potassium persulfate, ammonium persulfate and sodium persulfate, and hydrogen peroxide, etc.

Here, oxidizing agents such as persulfates may be used as a redox initiator by combining with a reducing agent such as sodium hydrogen sulfite, sodium thiosulfate and hydrosulfite or a polymerization promotor such as iron sulfate.

Additionally, in the polymerization of the polymer (A), a chain transfer agent may be used in order to adjust the molecular mass etc., or a dispersant may be used in order to improve dispersibility.

The chain transfer agent may be exemplified by mercaptan compounds, thioglycol, carbon tetrachloride and α-methylstyrene dimer.

The dispersant may be exemplified by water-soluble cellulose resins such as methyl cellulose, hydroxyethyl cellulose, hydroxypropylmethyl cellulose and carboxymethyl cellulose, polyvinyl alcohols, polyethylene glycol, polyvinylpyrrolidone polyacrylamide, organic substances of polystyrene sulfonate, inorganic solids such as calcium phosphate and calcium carbonate, glycerin fatty acid esters, sorbitan esters, propylene glycol fatty acid esters, sucrose fatty acid esters, citric acid mono-(di- or tri-)stearin esters, pentaerythritol fatty acid esters, trimethylolpropane fatty acid esters, polyglycerin fatty acid esters, polyoxyethylene glycerin fatty acid esters, polyesters, polyoxyethylene sorbitan fatty acid esters, polyethylene glycol fatty acid esters, polypropylene glycol fatty acid esters, polyoxyethylene glycol fatty alcohol ethers, polyoxyethylene alkyl phenyl ethers, N,N-bis(2-hydroxy ethylene)fatty amines, ethylene bis-stearic acid amide, condensation products of fatty acids and diethanol, block polymers of polyoxyethylene and polyoxypropylene, nonionic surfactants such as polyethylene glycol and polypropylene glycol, etc.

The polymerization solvent used for polymerizing the polymer (A) is not particularly limited and may be exemplified by water, methanol, ethanol, isopropanol, hexane, cyclohexane, benzene, toluene, xylene, acetone, methyl ethyl ketone, dimethoxyethane, tetrahydrofuran, chloroform, carbon tetrachloride, ethylene dichloride, ethyl acetate, N-methylpyrrolidone, N,N-dimethylformamide, N,N-dimethylacetamide, dimethylsulfoxide, etc.

These polymerization solvents may be used alone or in a combination of two or more.

(Polymer (B-1))

The polymer (B-1) is a substantially water-insoluble particulate polymer and a component that imparts flexibility to electrodes and provides batteries with battery properties in particular long-term cycle property.

Here, "substantially water-insoluble" in the present invention indicates that solubility to 100 g of water at 25° C. is less than 0.5 g (i.e. soluble limit to 100 g of water at 25° C.). The solubility is preferably no greater than 0.1 g.

Such a polymer (B-1) may be exemplified by particulate polymers that are polymerized by emulsion or suspension polymerization using one or more of monomers including aromatic vinyl compounds such as styrene, α-methylstyrene, and p-methylstyrene, conjugated diolefins such as butadiene, chlorine-containing vinyl compounds such as vinyl chloride and vinylidene chloride, fluorine-containing vinyl compounds such as vinylidene fluoride, hexafluoropropylene, ethylene trifluoride, ethylene chloride trifluoride, vinyl fluoride and perfluoroalkyl vinyl ether, acetate esters such as vinyl acetate, unsaturated nitrile compounds such as acrylonitrile and methacrylonitrile, methacrylic acid esters such as methyl methacrylate, ethyl methacrylate, propyl methacrylate, butyl methacrylate, 2-ethylhexyl methacrylate, 2-hydroxyethyl methacrylate, glycidyl methacrylate and allyl methacrylate, acrylic acid esters such as methyl acrylate, ethyl acrylate, propyl acrylate, butyl acrylate, 2-ethylhexyl acrylate, 2-hydroxyethyl acrylate, glycidyl acrylate and allyl acrylate, unsaturated acids such as acrylic acid, methacrylic acid, itaconic acid, fumaric acid and maleic acid, unsaturated amides such as acrylamide and methacrylamide, crosslinkable monomers such as divinylbenzene, ethylene glycol dimethacrylate, ethylene glycol diacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, and triallyl isocyanurate; in addition, polymers polymerized by solution polymerization, bulk polymerization or other processes and made into particulates can also be used. For example, it is possible to use particles that are obtained by dispersing in water a polyacrylonitrile powder resulting from suspension polymerization and forcing it to emulsify by a wet-type atomization apparatus.

Furthermore, it is also possible to use a graft copolymer as the polymer (B-1) that is obtained by graft-polymerizing a vinyl monomer such as styrene, (meth)acrylic acid ester and acrylonitrile in the presence of a rubber such as conjugated diene like polybutadiene, poly(meth)acrylic acid ester and polyorganosiloxane. It is also possible to use as the rubber a complex rubber consisting of a component of acrylic acid esters or methacrylic acid esters and a polyorganosiloxane component.

The content of the rubber in the graft copolymer is preferably from 40% to 90% by mass and more preferably from 50% to 90% by mass.

The polymer (B-1) is preferably a polymer or graft copolymer of aromatic vinyl compounds, fluorine-containing vinyl compounds or unsaturated nitrile compounds; among others, polyvinylidene fluoride, polyacrylonitrile or graft copolymer thereof is preferable.

The average particle diameter of the polymer (B-1) is preferably from 10 to 1000 nm, more preferably from 50 to 500 nm and still more preferably from 70 to 300 nm. In cases where the average particle diameter of the polymer (B-1) is within this range, as described later in detail, a stable resin composition can be obtained that allows suppression of sedimentation or agglomeration of the polymer (B-1) when using the resin composition as a binder in the production of electrodes.

Here, the average particle diameter of the polymer (B-1) is a volume average primary particle diameter measured using a laser diffraction/scattering particle size distribution analyzer.

(Rate)

In the resin composition in the first embodiment of the present invention, the mass ratio of the polymer (A) to the polymer (B-1), (polymer (A))/(polymer (B-1)), is preferably from 5/95 to 95/5 based on solid contents, more preferably from 25/75 to 75/25 and particularly preferably from 25/75 to 50/50. In cases where the mass ratio of the polymer (A) to the polymer (B-1) is within this range, handling properties of the slurry for electrodes and coating properties on current collectors become good when preparing the slurry for electrodes (slurry for secondary battery electrodes) using the resin composition and producing electrodes. Besides, uniformity is enhanced inside electrode layers formed from the slurry for electrodes.

The resin composition is obtained by mixing the polymer (A) and the polymer (B-1), for example. Additionally, the polymer (A), the polymer (B-1), an active material, etc. may be dispersed in a solvent at a timing of preparing the slurry for electrodes, as explained later in detail.

Additionally, the resin composition may consist of the polymer (A) and the polymer (B-1) or may also contain the polymer (B-2) described later.

As described above, the resin composition in the first embodiment of the present invention contains the polymer (A) and the polymer (B-1) and thus is excellent in binding ability. Moreover, the electrodes produced using the resin composition containing the polymer (A) and the polymer (B-1) are excellent in flexibility and also the batteries equipped with the electrodes are excellent in battery properties (in particular long-term cycle property).

Therefore, the resin composition in the first embodiment of the present invention allows to form the electrodes excellent in binding ability as well as flexibility, and thus the batteries excellent in battery properties (in particular long-term cycle property) can be obtained. Specifically, the electrodes undergoing no change in electrode layers can be formed in accordance with the evaluation of flexibility of electrodes by the flexibility test below.

Here, "no change in electrode layers" means that changes such as breaks and defects are not apparent in the electrode layer when observing by an optical microscope at a magnification of 60 times.

(Flexibility Test)

The binder resin composition for secondary battery electrodes and water are kneaded. An active material is added thereto and kneaded, and a conductive auxiliary agent is further added and kneaded in a case that the electrode is positive, and which is then adjusted to a coatable viscosity with water, thereby obtaining a slurry for electrodes. The amounts compounded are 2 parts by mass of the binder resin composition for secondary battery electrodes and 5 parts by mass of the conductive auxiliary agent based on 100 parts by mass of the active material.

The resulting slurry for electrodes is coated on a current collector and dried, thereby obtaining an electrode where an electrode layer of film thickness from 20 to 200 μm has been formed on the current collector.

The resulting electrode is cut out into 3 cm wide and 5 cm long to obtain a test piece.

A mandrel of 5 mm diameter is contacted to a current collector-facing surface of the resulting test piece and one side of the test piece is fixed by a tape, then the condition of the electrode layer is observed under the environment of a humidity of 10% or less in the state that the test piece is bent and the current collector-facing surface is positioned inside, thereby evaluating the flexibility of the electrode.

The resin composition in the first embodiment of the present invention is preferred as a binder for electrodes of both positive and negative electrodes of lithium ion secondary batteries.

<Slurry for Secondary Battery Electrodes>

The slurry for secondary battery electrodes (hereinafter referred to as "slurry for electrodes") in the first embodiment of the present invention contains the above-mentioned resin composition in the first embodiment of the present invention, an active material and a solvent. The slurry for electrodes may also contain a binder resin (another binder resin) other than the polymer (A) and the polymer (B-1), and a viscosity-adjusting agent, a binding ability-improving agent, a dispersant, etc. A conductive auxiliary agent may also be included in the slurry for electrodes in cases where the slurry for electrodes is used for positive electrodes.

The resin composition used for the slurry for electrodes in the first embodiment of the present invention is the above-mentioned resin composition in the first embodiment of the present invention, thus detail explanation thereof is omitted here.

The rate of the resin composition (i.e. sum of the polymer (A) and the polymer (B-1)) in the slurry for electrodes is preferably from 0.1 to 10 parts by mass and more preferably 0.2 to 5 parts by mass based on 100 parts by mass of the active material. In cases where the rate of the resin composition is at least 0.1 parts by mass, adhesiveness to current collectors and binding ability between active materials become good. On the other hand, in cases where the rate of the resin composition is no greater than 10 parts by mass, resistance degradation in electrodes can be suppressed.

The active material used in the slurry for electrodes may be those exhibiting different voltages between a positive electrode and a negative electrode.

The active material for positive electrodes (positive electrode active material) may be exemplified by a lithium-containing metal composite oxide that contains at least one metal selected from iron, cobalt, nickel and manganese, and lithium, for example.

On the other hand, the active material for negative electrodes (negative electrode active material) may be exemplified by carbon materials such as graphite, amorphous carbon, carbon fiber, coke and activated carbon; and composite materials of these carbon materials and metals such as silicon, tin and silver or oxides thereof.

The positive electrode active materials and negative electrode active materials may be used alone or in a combination of two or more.

The another binder resin may be exemplified by acrylic acid-modified SBR resins (SBR latex), acrylic rubber latex, etc. Furthermore, substantially water-insoluble non-particulate polymers such as vinyl acetate copolymers, styrene-butadiene block copolymers and polyvinylidene fluoride (PVDF) can also be used as the another binder resin.

The viscosity-adjusting agent may be exemplified by cellulose polymers such as carboxymethyl cellulose, methyl cellulose and hydroxypropyl cellulose and ammonium salts thereof; poly(meth)acrylate such as poly(sodium(meth)acrylate); polyvinyl alcohol, polyethylene oxide, polyvinyl pyrrolidone; copolymers of acrylic acid or acrylate and vinyl alcohol; copolymers of maleic anhydride, maleic acid or fumaric acid and vinyl alcohol; modified polyvinyl alcohol, modified polyacrylic acid, polyethylene glycol, polycarboxylic acids, etc. The viscosity-adjusting agent may also be used as the another binder resin.

The conductive auxiliary agent may be exemplified by graphite, carbon black, carbon nanotubes, carbon nanofibers, acetylene black, conductive polymers, etc.

These conductive auxiliary agents may be used alone or in a combination of two or more.

The solvent may be exemplified by water; mixed solvents of one or more of water, NMP, N,N-dimethylformamide, tetrahydrofuran, dimethylacetamide, dimethylsulfoxide, hexamethyl sulforamide, tetramethyl urea, acetone, methyl ethyl ketone and N-methylpyrrolidone and ester solvents (ethyl acetate, n-butyl acetate, butyl cellosolve acetate, butyl carbitol acetate, etc.); mixed solvents of NMP and glyme solvents (diglyme, triglyme, tetraglyme, etc.), etc. Among others, water is preferred from the viewpoint that solvent recovering cost, environmental load, and energy when drying etc. can be reduced.

These solvents may be used alone or in a combination of two or more.

Since the slurry for electrodes in the first embodiment of the present invention described above contains the resin composition in the first embodiment of the present invention, the electrodes excellent in binding ability as well as flexibility can be formed and the batteries excellent in battery properties (in particular long-term cycle property) can be obtained.

<Electrode for Secondary Batteries>

The electrode for secondary batteries (hereinafter referred to as "electrode") in the first embodiment of the present invention is equipped with a current collector and an electrode layer provided on the current collector.

The electrode layer is a layer containing at least an active material and the resin composition in the first embodiment of the present invention as the binder and may contain as necessary a binder resin (another binder resin) other than the polymer (A) and the polymer (B-1), and conventional additives such as a viscosity-adjusting agent, a binding ability-improving agent and a dispersant.

The active material, the another binder resin and the viscosity-adjusting agent may be exemplified by the active materials, another binder resins and viscosity-adjusting agents exemplified above in explaining the slurry for electrodes in the first embodiment of the present invention.

Additionally, the electrode layer of positive electrodes may contain a conductive auxiliary agent. By way of including the conductive auxiliary agent, battery performance can be further enhanced.

The conductive auxiliary agent may be exemplified by the conductive auxiliary agents exemplified above in explaining the slurry for electrodes in the first embodiment of the present invention.

The electrode layer is a layer formed on at least one side of a plate-like current collector, for example; its thickness is preferably from 0.1 to 500 μm, but which is not limiting. Additionally, since the capacity of active materials in positive electrodes is smaller than that in negative electrodes, the electrode layer of positive electrodes is preferably thicker than the electrode layer of negative electrodes.

The material of the current collector may be those having conductive property, and metals may be used. The metal is preferably those less likely to form an alloy with lithium and may be specifically exemplified by aluminum, copper, nickel, iron, titanium, vanadium, chromium and manganese, or alloys thereof.

The shape of the current collector may be exemplified by thin film-like, mesh-like and fiber-like. Among these, thin film-like is preferable. The thickness of the current collector is preferably from 5 to 30 μm and more preferably from 8 to 25 μm.

The electrode in the first embodiment of the present invention can be produced using a conventional method. For example, the resin composition in the first embodiment of the present invention, an active material, another binder resin as necessary, and additives such as a viscosity-adjusting agent and a conductive auxiliary agent are dispersed in a solvent to prepare a slurry for secondary battery electrodes (slurry for electrodes) (slurry preparing step), the slurry for electrodes is coated on a current collector (coating step), and the solvent is removed (solvent removing step), thereby obtaining an electrode where a layer (electrode layer) supporting the active material etc. by the resin composition in the first embodiment of the present invention has been formed on the current collector.

The slurry preparing step is a step in which the resin composition in the first embodiment of the present invention, the active material, the another binder resin as necessary, and the additives such as a viscosity-adjusting agent and a conductive auxiliary agent are dispersed in the solvent to prepare the slurry for electrodes. At this time, the polymer (A) and the polymer (B-1) described above may be preliminarily mixed to form the resin composition, or the polymer (A) and the polymer (B-1) may be dispersed in the solvent together with the active material etc. in the slurry preparing step; thus the timing to disperse the polymer (A), the polymer (B-1), the active material, etc. in the solvent is not particularly limited.

Additionally, an aqueous solution dissolving the polymer (A) in water, a dispersion liquid dispersing the polymer (B-1) in the solvent, and the active material may be mixed to prepare the slurry for electrodes. In this case, the aqueous solution of the polymer (A) and the dispersion liquid of the polymer (B-1) may be preliminarily mixed and then mixed with the active material, or the aqueous solution of the polymer (A) and the active material may be mixed and then mixed with the dispersion liquid of the polymer (B-1); preferably, the aqueous solution of the polymer (A) and the active material are mixed and then mixed with the dispersion liquid of the polymer (B-1) from the viewpoint that dispersibility of the active material becomes good and thus a uniform slurry for electrodes can be prepared.

The rate of the resin composition (i.e. sum of the polymer (A) and the polymer (B-1)) in the first embodiment of the present invention is preferably from 0.1 to 10 parts by mass and more preferably 0.2 to 5 parts by mass based on 100 parts by mass of the active material. In cases where the rate of the resin composition is at least 0.1 part by mass, adhesiveness to current collectors and binding ability between active materials become good. On the other hand, in cases where the rate of the resin composition is no greater than 10 parts by mass, resistance degradation in electrodes can be suppressed.

The solvent used in the slurry preparing step may be exemplified by the solvents exemplified above in explaining the slurry for electrodes in the first embodiment of the present invention.

The slurry for electrodes can be obtained by kneading at least the resin composition in the first embodiment of the present invention and the active material in the presence of the solvent.

The kneading process is not particularly limited as long as the process can sufficiently knead the resin composition and the active material and may be exemplified by kneading processes using various dispersers such as planetary centrifugal mixers, planetary mixers, homogenizers, ball mills, sand mills and roll mills.

The coating step is a step of coating on the current collector the slurry for electrodes resulting from the slurry preparing step.

The coating process is not particularly limited as long as the slurry for electrodes can be coated on the current collector by the process such that the thickness of the electrode layer is from 0.1 to 500 µm. Examples thereof include bar coating processes, doctor blade processes, knife processes, dipping processes, reverse roll processes, direct roll processes, gravure processes, extrusion processes, curtain processes, dipping processes, brush coating processes, etc.

The solvent removing step is a step of removing the solvent in the slurry for electrodes coated on the current collector.

Conventional processes may be used as the removing process as long as the solvent can be removed. Particularly, it is preferred that hot wind, vacuum, infrared rays, far-infrared rays, electron beam and cold wind are used alone or in combination.

The removing condition is not particularly limited as long as the solvent can be sufficiently removed and also the polymer (A) and the polymer (B-1) are not decomposed; it is preferred that heating treatment is carried out at from 40 to 120° C. preferably from 60 to 100° C. for from 1 minute to 10 hours. Under this condition, high adhesiveness can be imparted between the active material and the current corrector or between the active materials without decomposing the polymer (A) and the polymer (B-1). Furthermore, the current collector is less likely to corrode.

After the solvent removing step, the electrode layer may be pressed as necessary (pressing step). By performing the pressing step, the electrode can be expanded for the area and adjusted to an optional thickness, and smoothness and electric density at the surface of the electrode layer can be increased. The pressing process may be exemplified by mold pressing, roll pressing, etc.

As necessary, the resulting electrode for batteries may be further cut into an optional size (slit processing step).

The resin composition in the first embodiment of the present invention is used as the binder of the electrode in the first embodiment of the present invention obtained in this way; therefore, binding ability to the current collector of the electrode layer is high and flexibility thereof is excellent. Furthermore, since the active material is resistant to drop out, the discharged capacity can be maintained at a high level for a long time.

The electrode in the first embodiment of the present invention is preferred as the electrode for lithium ion secondary batteries.

<Lithium Ion Secondary Battery>

The lithium ion secondary battery in the first embodiment of the present invention is equipped with the electrode in the first embodiment of the present invention.

The lithium ion secondary battery may be exemplified by a nonaqueous secondary battery in which a positive electrode and a negative electrode are disposed through a permeable separator (e.g. porous film made of polyethylene or polypropylene) therebetween and a nonaqueous electrolyte solution is impregnated therein; a cylindrical nonaqueous secondary battery in which a laminated body, consisting of positive electrode/separator where electrode layers have been formed on both sides of negative electrode/separator/current collector where electrode layers have been formed on both sides of a current corrector, is wound into a wound body like a roll shape (whorl shape), then which is housed in a bottomed metal casing together with an electrolyte solution; etc.

As for the electrolyte solution, a solution of a lithium salt as electrolyte dissolved to a concentration of about 1 M in a nonaqueous organic solvent is used in cases of the lithium ion secondary battery, for example.

The lithium salt may be exemplified by $LiClO_4$, $LiBF_4$, LiI, $LiPF_6$, $LiCF_3SO_3$, $LiCF_3CO_2$, $LiAsF_6$, $LiSbF_6$, $LiAlCl_4$, LiCl, LiBr, LiB $(C_2H_5)_4$, $LiCH_3SO_3$, $LiC_4F_9SO_3$, $Li(CF_3SO_2)_2N$, $Li[(CO_2)_2]_2B$, etc.

On the other hand, the nonaqueous organic solvent may be exemplified by carbonates such as propylene carbonate, ethylene carbonate, butylene carbonate, dimethyl carbonate, diethyl carbonate and methyl ethyl carbonate; lactones such as γ-butyrolactone; ethers such as trimethoxymethane, 1,2-dimethoxyethane, diethylether, 2-ethoxyethane, tetrahydrofuran and 2-methyltetrahydrofuran; sulfoxides such as dimethyl sulfoxide; oxolanes such as 1,3-dioxolane and 4-methyl-1,3-dioxolane; nitrogen-containing ones such as acetonitrile, nitromethane and NMP; esters such as methyl formate, methyl acetate, butyl acetate, methyl propionate, ethyl propionate and phosphate triester; glymes such as diglyme, triglyme and tetraglyme; ketones such as acetone, diethyl ketone, methyl ethyl ketone and methyl isobutyl ketone; sulfones such as sulfolane; oxazolidinones such as 3-methyl-2-oxazolidinone; sultones such as 1,3-propane sultone, 4-butane sultone and naphtha sultone, etc.

The electrolyte solutions may be used alone or in a combination of two or more.

The lithium ion secondary battery can be obtained by disposing a positive electrode and a negative electrode through a permeable separator therebetween and impregnating a nonaqueous electrolyte solution thereto, for example.

Additionally, it can be obtained in cases of cylindrical shape as the following.

Initially, a laminated body, consisting of positive electrode/separator where electrode layers have been formed on both sides of negative electrode/separator/current collector where electrode layers have been formed on both sides of a current corrector, is wound into a wound body like a roll shape (whorl shape). The resulting wound body is housed in a bottomed metal casing (battery can), and the negative electrode is connected to a negative electrode terminal and the positive electrode is connected to a positive electrode terminal. Next, the electrolyte solution is impregnated in the metal casing and then the metal casing is sealed, thereby obtaining the cylindrical lithium ion secondary battery.

The lithium ion secondary battery in the first embodiment of the present invention obtained in this way is equipped with the electrode using as the binder the resin composition in the first embodiment of the present invention, thus battery performance thereof is excellent. The reasons of the excellent battery performance are that the electrode is excellent in flexibility and thus the electrode is resistant to crack even when a stress is applied, and binding ability to the current collector of the electrode layer is high, and also the resin composition is resistant to swell even when the electrode is immersed into the electrolyte solution, consequently, the discharged capacity can be maintained at a high level for a long time.

Second Embodiment

<Binder Resin Composition for Secondary Battery Electrodes>

The binder resin composition for secondary battery electrodes (hereinafter referred to as "resin composition") in the second embodiment of the present invention contains the polymer (A) and the polymer (B-2) shown below.

(Polymer (A))

The polymer (A) is a polymer containing a structural unit represented by the above-mentioned general formula (1).

The polymer (A) used for the resin composition in the second embodiment of the present invention is the same as the polymer (A) used for the resin composition in the first embodiment of the present invention, thus detail explanation thereof is omitted here.

(Polymer (B-2))

The polymer (B-2) is a substantially water-soluble high-molecular substance (polymer) and has an acidic group and/or a salt thereof. The polymer (B-2) is a component that imparts an appropriate viscosity to the slurry for secondary battery electrodes (slurry for electrodes) and provides stability of the slurry for electrodes and battery properties in particular long-term cycle property.

Here, the "substantially water-soluble" in the present invention indicates that solubility to 100 g of water at 25° C. is at least 0.5 g (i.e. soluble limit to 100 g of water at 25° C.). The solubility is preferably at least 1 g.

The acidic group and/or the salt thereof, which the polymer (B-2) has, is preferably a carboxyl group, a salt of carboxyl group, a sulfonic acid group, a salt of sulfonic acid group, a phosphoric acid group or a salt of phosphoric acid group. The polymer (B-2) may contain singularly one of these or may contain mixedly two or more of these.

The salt of acid group may be exemplified by alkali metal salts, alkaline-earth metal salts, ammonium salts, substituted ammonium salts of acidic groups, etc.

The alkali metal may be exemplified by lithium, sodium, potassium, etc.

The alkaline-earth metal may be exemplified by magnesium, calcium, etc.

The substituted ammonium may be exemplified by aliphatic ammoniums, cyclic saturated ammoniums, cyclic unsaturated ammoniums, etc.

Such a polymer (B-2) may be exemplified by carboxyl group-containing high-molecular substances such as carboxymethyl cellulose, polyacrylic acid, polymethacrylic acid, polyitaconic acid, polyfumaric acid, polycrotonic acid, polymaleic acid, copolymers of (meth)acrylic acid-itaconic acid and copolymers of (meth)acrylic acid-(anhydrous)maleic acid, and salts thereof; sulfonic acid group-containing high-molecular substances such as poly(meth)allyl sulfonic acid, poly(meth)allyloxybenzene sulfonic acid, polystyrene sulfonic acid, and 2-acrylamido-2-methyl propane sulfonic acid polymer, and salts thereof; phosphoric acid group-containing high-molecular substances such as 2-(meth)acryloyloxyethyl acid phosphate polymer, 2-(meth)acryloyloxyethyl acid phosphate monoethanolamine polymer, diphenyl ((meth)acryloyloxyethyl)phosphate polymer, (meth) acryloyloxypropyl acid phosphate polymer, 3-chloro-2-acid phosphoxypropyl (meth)acrylate polymer, acid phosphoxy polyoxyethylene glycol mono(meth)acrylate polymer, and acid phosphoxy polyoxypropylene glycol mono(meth)acrylate polymer, and salts thereof.

The aniline polymer having a sulfonic acid group and/or a carboxylic group represented by the general formula (2) below may also preferably be used as the polymer (B-2).

[Chem. 3]

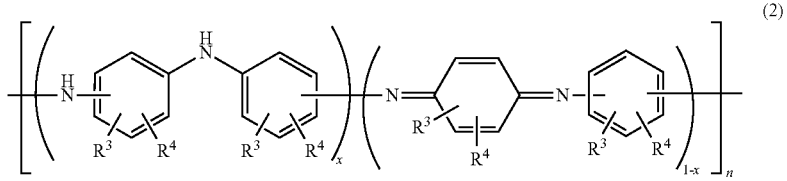

In the general formula (2), $R^3$ is a group selected from the group consisting of sulfonic acid groups, carboxyl groups, and alkali metal salts, alkaline-earth metal salts, ammonium salts, and substitutes ammonium salts thereof; $R^4$ is a group selected from the group consisting of methyl group, ethyl group, n-propyl group, iso-propyl group, n-butyl group, isobutyl group, sec-butyl group, tert-butyl group, dodecyl group, tetracosyl group, methoxy group, ethoxy group, n-propoxy group, n-butoxy group, iso-butoxy group, sec-butoxy group, tert-butoxy group, pentoxy group, hexoxy group, octoxy group, dodecoxy group, tetradecoxy group, fluoro group, chloro group and bromo group; x is any number of 0<x<1, and n represents a polymerization degree of at least 3.

Polyethylenedioxythiophene polystyrene sulfate may also be used as the polymer (B-2). The polymer has a structure where polystyrene sulfonic acid is added as a dopant although sulfonic acid group is not introduced into the skeleton of the polymer.

These may be used alone or in a combination of two or more as the polymer (B-2).
(Rate)

In the resin composition in the second embodiment of the present invention, the mass ratio of the polymer (A) to the polymer (B-2), (polymer (A))/(polymer (B-2)), is preferably from 5/95 to 99.5/0.5 based on solid contents, more preferably from 60/40 to 99/1, and particularly preferably from 80/20 to 99/1. In cases where the mass ratio of the polymer (A) to the polymer (B-2) is within this range, stability of the slurry for electrodes is improved, and when preparing a slurry for electrodes using the resin composition and producing electrodes, handling properties of the slurry for electrodes and coating properties on current collectors become good. Besides, uniformity is enhanced inside electrode layers formed from the slurry for electrodes.
(Viscosity Ratio)

In the resin composition in the second embodiment of the present invention, the ratio (β/α) between the viscosity (α) of 1% by mass aqueous solution of the polymer (A) and the viscosity (β) of the solution where 10 parts by mass of the polymer (B-2) has been added thereto based on 100 parts by mass of the polymer (A) is preferably at least 5 and more preferably at least 7. In cases where β/α is at least 5, stability of the slurry for electrodes is improved, and coating properties on current collectors and adhesiveness of the electrode layer to current collectors are enhanced. Upper limit of β/α is preferably up to 1000 and more preferably up to 700 from the viewpoint that handling properties of the slurry for electrodes become good.

The viscosity (α) can be determined by measuring viscosity of 1% by mass aqueous solution of the polymer (A) as follows.

Initially, the polymer (A) is dissolved in ion-exchange water so that concentration of the polymer (A) is 1% by mass, thereby obtaining the 1% by mass aqueous solution of the polymer (A). The resulting 1% by mass aqueous solution of the polymer (A) is measured for viscosity at 25° C. using a B-type viscometer. A rotor used and rotation number may be decided considering the measurable range of the viscosity.

On the other hand, the viscosity (β) can be determined by measuring viscosity of the solution where the polymer (B-2) has been added to the 1% by mass aqueous solution of the polymer (A) as follows.

Initially, the polymer (A) is dissolved in ion-exchange water so that concentration of the polymer (A) is 1% by mass, thereby obtaining the 1% by mass aqueous solution of the polymer (A). 10 parts by mass of the polymer (B-2) is added to the aqueous solution based on 100 parts by mass of the polymer (A). The resulting solution is measured for viscosity similarly to the 1% by mass aqueous solution of the polymer (A).

The resin composition is obtained by mixing the polymer (A) and the polymer (B-2), for example. Additionally, the polymer (A), the polymer (B-2), an active material, etc. may be dispersed in a solvent at a timing of preparing the slurry for electrodes, as explained later in detail.

Furthermore, the resin composition may consist of the polymer (A) and the polymer (B-2) or may also contain the polymer (B-1) described above.

As explained above, the resin composition in the second embodiment of the present invention contains the polymer (A) and the polymer (B-2) and thus the viscosity becomes a level in which separation of the slurry and sedimentation of active materials are less likely to occur even in cases of preparing the slurry for electrodes of negative electrodes; therefore, slurries for electrodes excellent in stability can be obtained. Moreover, since the electrode produced using the resin composition containing the polymer (A) and the polymer (B-2) is less likely to generate nonuniform distribution of active materials and binders, the battery equipped with the electrode is excellent in battery properties (in particular long-term cycle property).

Consequently, by use of the resin composition of the present invention, slurries for electrodes excellent in stability can be obtained, electrodes equipped with the electrode layer where nonuniform distribution of active materials and binders is less and uniformity is excellent can be formed, and batteries excellent in battery properties (in particular long-term cycle property) can be obtained.

The resin composition in the second embodiment of the present invention is suited to the binder for electrodes for both of positive and negative electrodes of lithium ion secondary batteries.
<Slurry for Secondary Battery Electrodes>

The slurry for secondary battery electrodes (hereinafter referred to as "slurry for electrodes") in the second embodiment of the present invention contains the above-mentioned resin composition in the second embodiment of the present invention, an active material and a solvent. The slurry for electrodes may also contain a binder resin (another binder resin) other than the polymer (A) and the polymer (B-2), and a viscosity-adjusting agent, a binding ability-improving agent, a dispersant, etc. A conductive auxiliary agent may also be included in the slurry for electrodes in cases where the slurry for electrodes is used for positive electrodes.

The resin composition used for the slurry for electrodes in the second embodiment of the present invention is the above-mentioned resin composition in the second embodiment of the present invention, thus detail explanation thereof is omitted here.

The rate of the resin composition (i.e. sum of the polymer (A) and the polymer (B-2)) in the slurry for electrodes is preferably from 0.1 to 10 parts by mass and more preferably 0.2 to 5 parts by mass based on 100 parts by mass of the active material. In cases where the rate of the resin composition is at least 0.1 parts by mass, adhesiveness to current collectors and binding ability between active materials become good. On the other hand, in cases where the rate of the resin composition is no greater than 10 parts by mass, resistance degradation in electrodes can be suppressed.

The active material, the conductive auxiliary agent, and the solvent used for the slurry for electrodes may be exemplified by the active materials, the conductive auxiliary agents, and the solvents exemplified above in explaining the slurry for electrodes in the first embodiment of the present invention.

The another binder resin may be exemplified by acrylic acid-modified SBR resins (SBR latex), acrylic rubber latex, etc.

The viscosity-adjusting agent may be exemplified by cellulose polymers such as methyl cellulose and hydroxypropyl cellulose, and ammonium salts thereof; polyvinyl alcohol, polyethylene oxide, polyvinyl pyrrolidone, copolymers of acrylic acid or acrylate and vinyl alcohol, copolymers of maleic anhydride, maleic acid or fumaric acid and vinyl alcohol, modified polyvinyl alcohol, modified polyacrylic acid, polyethylene glycol, etc. The viscosity-adjusting agent may also be used as the another binder resin.

The slurry for electrodes in the second embodiment of the present invention described above contains the resin composition in the second embodiment of the present invention and thus is excellent in stability even when used for negative electrodes, therefore allowing to form electrodes in which uneven distribution of active materials is suppressed and also to obtain batteries excellent in battery properties in particular long-term cycle property.

<Electrode for Secondary Batteries>

The electrode for secondary batteries (hereinafter referred to as "electrode") in the second embodiment of the present invention is equipped with a current collector and an electrode layer provided on the current collector.

The electrode layer is a layer containing at least the resin composition in the second embodiment of the present invention as the binder and may contain as necessary a binder resin (another binder resin) other than the polymer (A) and the polymer (B-2), and conventional additives such as a viscosity-adjusting agent, a binding ability-improving agent and a dispersant.

The active material may be exemplified by the active materials exemplified above in explaining the slurry for electrodes in the first embodiment of the present invention.

The another binder resin and the viscosity-adjusting agent may be exemplified by the another binder resins and viscosity-adjusting agents exemplified above in explaining the slurry for electrodes in the second embodiment of the present invention.

Additionally, the electrode layer of electrodes (positive electrodes in particular) may contain a conductive auxiliary agent. By way of including the conductive auxiliary agent, battery performance can be further enhanced.

The conductive auxiliary agent may be exemplified by the conductive auxiliary agents exemplified above in explaining the slurry for electrodes in the first embodiment of the present invention.

The electrode layer is a layer formed on at least one side of a plate-like current collector, for example; its thickness is preferably from 0.1 to 500 μm, but which is not limiting. Additionally, since the capacity of active materials in positive electrodes is smaller than that in negative electrodes, the electrode layer of positive electrodes is preferably thicker than the electrode layer of negative electrodes.

The material of the current collector may be those having conductive property, and metals may be used. The metal is preferably those less likely to form an alloy with lithium and may be specifically exemplified by aluminum, copper, nickel, iron, titanium, vanadium, chromium and manganese, or alloys thereof.

The shape of the current collector may be exemplified by thin film-like, mesh-like and fiber-like. Among these, thin film-like is preferable. The thickness of the current collector is preferably from 5 to 30 μm and more preferably from 8 to 25 μm.

The electrode in the second embodiment of the present invention can be produced using a conventional method. For example, the resin composition in the second embodiment of the present invention, an active material, another binder resin as necessary, and additives such as a viscosity-adjusting agent and a conductive auxiliary agent are dispersed in a solvent to prepare a slurry for secondary battery electrodes (slurry for electrodes) (slurry preparing step), the slurry for electrodes is coated on a current collector (coating step), and the solvent is removed (solvent removing step), thereby obtaining an electrode where a layer (electrode layer) supporting the active material etc. by the resin composition in the second embodiment of the present invention has been formed on the current collector.

The slurry preparing step is a step in which the resin composition in the second embodiment of the present invention, the active material, the another binder resin as necessary, and the additives such as a viscosity-adjusting agent and a conductive auxiliary agent are dispersed in the solvent to prepare the slurry for electrodes. At this time, the polymer (A) and the polymer (B-2) described above may be preliminarily mixed to form the resin composition, or the polymer (A) and the polymer (B-2) may be dispersed in the solvent together with the active material etc. in the slurry preparing step; thus the timing to disperse the polymer (A), the polymer (B-2), the active material, etc. in the solvent is not particularly limited.

The rate of the resin composition (i.e. sum of the polymer (A) and the polymer (B-2)) in the second embodiment of the present invention is preferably from 0.1 to 10 parts by mass and more preferably 0.2 to 5 parts by mass based on 100 parts by mass of the active material. In cases where the rate of the resin composition is at least 0.1 part by mass, adhesiveness to current collectors and binding ability between active materials become good. On the other hand, in cases where the rate of the resin composition is no greater than 10 parts by mass, resistance degradation in electrodes can be suppressed.

The solvent used for the slurry preparing step may be exemplified by the solvents exemplified above in explaining the slurry for electrodes in the first embodiment of the present invention.

The slurry for electrodes can be obtained by kneading at least the resin composition in the second embodiment of the present invention and the active material in the presence of the solvent.

The kneading process is not particularly limited as long as the process can sufficiently knead the resin composition and the active material and may be exemplified by kneading processes using various dispersers such as planetary centrifugal mixers, planetary mixers, homogenizers, ball mills, sand mills and roll mills.

The coating step is a step of coating on the current collector the slurry for electrodes resulting from the slurry preparing step.

The coating process is not particularly limited as long as the slurry for electrodes can be coated on the current collector by the process such that the thickness of the electrode layer is from 0.1 to 500 μm. Examples thereof include bar coating processes, doctor blade processes, knife processes, dipping processes, reverse roll processes, direct roll processes, gravure processes, extrusion processes, curtain processes, dipping processes, brush coating processes, etc.

The solvent removing step is a step of removing the solvent in the slurry for electrodes coated on the current collector.

Conventional processes may be used as the removing process as long as the solvent can be removed. Particularly, it is preferred that hot wind, vacuum, infrared rays, far-infrared rays, electron beam and cold wind are used alone or in combination.

The removing condition is not particularly limited as long as the solvent can be sufficiently removed and also the polymer (A) and the polymer (B-2) are not decomposed; it is preferred that heating treatment is carried out at from 40 to 120° C. preferably from 60 to 100° C. for from 1 minute to 10 hours. Under this condition, high adhesiveness can be imparted between the active material and the current corrector or between the active materials without decomposing the polymer (A) and the polymer (B-2). Furthermore, the current collector is less likely to corrode.

After the solvent removing step, the electrode layer may be pressed as necessary (pressing step). By performing the pressing step, the electrode can be expanded for the area and adjusted to an optional thickness, and smoothness and electric density at the surface of the electrode layer can be increased. The pressing process may be exemplified by mold pressing, roll pressing, etc.

As necessary, the resulting electrode for batteries may be further cut into an optional size (slit processing step).

The resin composition in the second embodiment of the present invention is used as the binder in the electrode of the present invention obtained in this way; therefore, the viscosity reaches a level at which separation of slurries and sedimentation of active materials are less likely to occur even in cases of preparing the slurry for electrodes of negative electrodes, thus production is carried out using the slurry for electrodes excellent in stability. Consequently, the electrode in the second embodiment of the present invention is equipped with the electrode layer where nonuniform distribution of active materials and binders is less and uniformity is excellent, thereby resulting in batteries allowing to maintain the discharged capacity at a high level for a long time.

The electrode in the second embodiment of the present invention is preferred as the electrode for lithium ion secondary batteries.

<Lithium Ion Secondary Battery>

The lithium ion secondary battery in the second embodiment of the present invention is equipped with the electrode in the second embodiment of the present invention.

The lithium ion secondary battery may be exemplified by a nonaqueous secondary battery in which a positive electrode and a negative electrode are disposed through a permeable separator (e.g. porous film made of polyethylene or polypropylene) therebetween and a nonaqueous electrolyte solution is impregnated therein; a cylindrical nonaqueous secondary battery in which a laminated body, consisting of positive electrode/separator where electrode layers have been formed on both sides of negative electrode/separator/current collector where electrode layers have been formed on both sides of a current corrector, is wound into a wound body like a roll shape (whorl shape), then which is housed in a bottomed metal casing together with an electrolyte solution; etc.

As for the electrolyte solution, a solution of a lithium salt as electrolyte dissolved to a concentration of about 1 M in a nonaqueous organic solvent is used in cases of the lithium ion secondary battery, for example.

The lithium salt and the nonaqueous organic solvent may be exemplified by the lithium salts and the nonaqueous organic solvents exemplified above in explaining the lithium ion secondary battery in the first embodiment of the present invention.

The lithium ion secondary battery can be obtained by disposing a positive electrode and a negative electrode through a permeable separator therebetween and impregnating a nonaqueous electrolyte solution thereto, for example. Additionally, in cases of cylindrical shape, it can be obtained by the processes exemplified above in explaining the lithium ion secondary battery in the first embodiment of the present invention.

The lithium ion secondary battery in the second embodiment of the present invention obtained in this way is equipped with the electrode using as the binder the resin composition in the second embodiment of the present invention, thus battery performance thereof is excellent. The reasons of the excellent battery performance are that the electrode can be produced using the slurry for electrodes excellent in stability, thus active materials etc. are less likely to settle out and uniformity of electrode layers is good, and also the resin composition is resistant to swell even when the electrode is immersed into the electrolyte solution, consequently, the discharged capacity can be maintained at a high level for a long time.

EXAMPLES

Hereinafter, the present invention is specifically explained with reference to Examples, but the present invention is not limited to Examples below.

Test 1

Production of Polymer (A)

Production Example 1: Production of N-vinylformamide Polymer (A1)

An aqueous monomer solution of 30 parts by mass of N-vinylformamide mixed with 70 parts by mass of deionized water was adjusted to pH=6.3 by phosphoric acid, thereby obtaining an adjusted monomer solution. The adjusted monomer solution was cooled to 5° C. and then placed into an insulating reaction container attached with a thermometer, followed by aerating with nitrogen for 15 minutes. Thereafter, 0.4 part by mass of 12% by mass aqueous solution of 4,4'-azobis(4-cyanovaleric acid) (manufactured by Wako Pure Chemical Industries, Ltd., "V-501") was added thereto, and then each of 10% by mass aqueous solution of tert-butylhydroperoxide and 10% by mass aqueous solution of sodium hydrogen sulfite was added thereto by 0.1 part by mass to carry out polymerization. Aging was further carried out for 1 hour after the inner temperature passed its peak, and the gel was taken out and crushed by a meat chopper followed by drying at 60° C. for 10 hours, then the resulting solid was crushed, thereby obtaining N-vinylformamide polymer (A1).

Production Example 2: Production of N-Vinylacetamide Polymer (A2)

An aqueous solution of 95 parts by mass of cyclohexane and 5 parts by mass of deionized water, in which 1.5 parts by mass of polyoxyalkylene alkyl ether was mixed as an emulsifier, was warmed to 55° C. and aerated with nitrogen for 1 hour. Thereafter, 0.8 part by mass of 12% by mass aqueous solution of 4,4'-azobis(4-cyanovaleric acid) (manufactured by Wako Pure Chemical Industries, Ltd., "V-501") was added thereto as a polymerization initiator. Then, 30 parts by mass of 75% by mass aqueous solution of N-vinylacetamide was added dropwise over 1 hour. After completing the dropwise addition, it was kept warm at 55° C. for 2 hours and then cooled to obtain a polymer suspension. The resulting polymer suspension was filtered and the resulting solid was dried at 60° C. under vacuum, thereby obtaining N-vinylacetamide polymer (A2).

Measurement/Evaluation Method

Measurement of Average Particle Diameter

Volume average primary particle diameter of the polymer (B-1) was measured using a laser diffraction/scattering particle size distribution analyzer and it was defined as the average particle diameter of the polymer (B-1).

Measurement of Peel Strength

Peel strength was evaluated for the resulting electrode by the method below.

A positive electrode or a negative electrode of examples was cut out into 2 cm wide to obtain a test piece 1. The test piece 1 was adhered to a polycarbonate plate (2.5 cm by 10 cm by 1 mm thick) by a double-stick tape (manufactured by Sekisui Chemical Co. Ltd., "#570"), thereby obtaining a test piece to be measured. During this step, the positive electrode or the negative electrode was adhered to the polycarbonate plate such that an electrode layer contacts the polycarbonate plate.

Load when peeling a current collector from the test piece to be measured was measured using a Tensilon universal tester (manufactured by Orientec Co. Ltd., "RTC-1210A"). Five test pieces were measured and the averaged value thereof was defined as the peel strength. The measurement conditions were 10 mm/min of peel speed, 180° of peel angle, 23° C. of environmental temperature and 40% RH of environmental humidity. The larger peel strength means that the electrode layer bonds more strongly to the current collector.

Evaluation of Flexibility

The resulting electrode was evaluated for flexibility by the method below.

A positive electrode or a negative electrode of examples was cut out into 3 cm wide and 5 cm long to obtain a test piece 2. The test piece 2 was measured for flexibility with reference to the general method of paints and varnishes bend test (cylindrical mandrel method) of JIS K 5600-5-1:1999 (ISO 1519:1973).

In cases where the flexibility of positive electrodes was evaluated, a mandrel of 5 mm diameter was contacted to a current collector-facing surface of the resulting test piece 2 and one side of the test piece 2 was fixed by a tape, then the condition of electrode layer was observed using a 60 times microscope (manufactured by 3R Systems Co., "wireless digital microscope") under the environment of a humidity of 10% or less in the state that the test piece 2 was bent and the current collector-facing surface was positioned inside, and the flexibility of positive electrodes was evaluated in accordance with the evaluation criteria below.

In cases where the flexibility of negative electrodes was evaluated, the evaluation was carried out similarly to that of positive electrodes except that a mandrel of 3 mm diameter was contacted to the current collector-facing surface of the resulting test piece 2.

Good: no changes such as breaks and defects were apparent in the electrode layer; and Bad: changes such as breaks and defects were apparent in the electrode layer.

Evaluation of Battery Properties

The resulting electrode was evaluated for battery properties by the method below.

A positive electrode of examples and a commercially available metal lithium electrode (negative electrode) or a negative electrode of examples and a commercially available metal lithium electrode (positive electrode) were oppositely faced through a separator (Celgard #2400). A 2032 type coin battery was fabricated using 1 M lithium hexafluorophosphate as an electrolyte solution (ethylene carbonate/diethyl carbonate=1/2 (volume ratio)).

The resulting 2032 type coin battery was tested by a constant current method (current density: 0.6 mA per one gram of active material) in which charge-discharge rate was 0.5 C at 60° C.

In a case of the 2032 type coin battery using a positive electrode of examples, charge and discharge of charging to 4.2 V and discharging to 3 V was repeated 50 times, and then battery capacity at the 50th cycle was measured.

In a case of the 2032 type coin battery using a negative electrode of examples, charge and discharge of charging to 3.0 V and discharging to 0 V was repeated 50 times, and then battery capacity at the 50th cycle was measured.

A rate of battery capacity at the 50th cycle versus battery capacity at the 1st cycle was expressed as a percentage and it was defined as a capacity-maintaining rate.

Example 1-1

Preparation of Slurry for Positive Electrodes 50 parts by mass (2 parts by mass as solid content) of 4% by mass aqueous solution of N-vinylformamide polymer (A1) as the polymer (A) and 40 parts by mass of deionized water were weighed into an ointment container, to which then 100 parts by mass of lithium cobalt oxide (manufactured by Nippon Chemical Industrial Co. Ltd., "Cellseed C-5H") and 5 parts by mass of acetylene black (manufactured by Denki Kagaku Kogyo K.K.) were added and kneaded using a rotation-revolution mixer (manufactured by Thinky Co. Ltd., "Awatori Neritaro") under a condition of rotation 1000 rpm and revolution 2000 rpm. After sufficient kneading, 4 parts by mass (2 parts by mass as solid content) of polyvinylidene fluoride latex (manufactured by Arkema Co. Ltd., average particle diameter: 127 nm, solid content: 49.6% by mass) as the polymer (B-1) was added thereto, and which was then viscosity-adjusted to a coatable viscosity using deionized water while stirring by the rotation-revolution mixer, thereby obtaining a slurry for positive electrodes.

The compounded composition of the slurry for positive electrodes is shown in Table 1.

Fabrication of Positive Electrode

The resulting slurry for positive electrodes was coated on a current collector (aluminum foil, 19 cm by 25 cm, 20 μm thick) using a doctor blade, and which was then dried in a hot-air circulation-type dryer at 60° C. for 30 minutes and further dried under reduced pressure in a vacuum drier at 80° C. for 12 hours, thereby obtaining a positive electrode where an electrode layer of film thickness 80 μm was formed on the current collector (aluminum foil).

The resulting positive electrode was measured for peel strength and evaluated for flexibility and battery properties. The results are shown in Table 2.

Example 1-2

A slurry for positive electrodes was prepared similarly to Example 1-1 except that 25 parts by mass (1 part by mass as solid content) of 4% by mass aqueous solution of N-vinylformamide polymer (A1) and 40 parts by mass of deionized water were weighed into an ointment container, a positive electrode was fabricated, and various measurements and evaluations were performed. The compounded composition of the slurry for positive electrodes is shown in Table 1. The results of measurements and evaluations are also shown in Table 2.

Example 1-3

A slurry for positive electrodes was prepared similarly to Example 1-1 except that N-vinylacetamide polymer (A2) was used as the polymer (A) in place of the N-vinylformamide polymer (A1), a positive electrode was fabricated, and various measurements and evaluations were performed. The compounded composition of the slurry for positive electrodes is shown in Table 1. The results of measurements and evaluations are also shown in Table 2.

Example 1-4

A slurry for positive electrodes was prepared similarly to Example 1-1 except that 8 parts by mass (2 parts by mass as solid content) of acrylic silicone latex (average particle diameter: 166 nm, solid content: 25% by mass) resulting from graft-polymerizing methyl methacrylate to a complex rubber consisting of a butyl acrylate component and a polyorganosiloxane component was used as the polymer (B-1) in place of the polyvinylidene fluoride latex, a positive electrode was fabricated, and various measurements and evaluations were performed. The compounded composition of the slurry for positive electrodes is shown in Table 1. The results of measurements and evaluations are also shown in Table 2.

Example 1-5

A slurry for positive electrodes was prepared similarly to Example 1-1 except that 27 parts by mass (2 parts by mass as solid content) of polyacrylonitrile latex (average particle diameter: 400 nm, solid content: 7.5% by mass) resulting from dispersing in water a polyacrylonitrile powder obtained by suspension polymerization and forcing it to emulsify by a wet-type atomization apparatus was used as the polymer (B-1) in place of the polyvinylidene fluoride latex, a positive electrode was fabricated, and various measurements and evaluations were performed. The compounded composition of the slurry for positive electrodes is shown in Table 1. The results of measurements and evaluations are also shown in Table 2.

Example 1-6

Preparation of Slurry for Negative Electrodes 50 parts by mass (2 parts by mass as solid content) of 4% by mass aqueous solution of N-vinylformamide polymer (A1) as the polymer (A) and 50 parts by mass of deionized water were weighed into an ointment container, to which then 100 parts by mass of natural graphite-type negative electrode active material (manufactured by Mitsubishi Chemical Co., "MPGC16") was added and kneaded using the rotation-revolution mixer (manufactured by Thinky Co. Ltd., "Awatori Neritaro") under a condition of rotation 1000 rpm and revolution 2000 rpm. After sufficient kneading, 4 parts by mass (2 parts by mass as solid content) of polyvinylidene fluoride latex (manufactured by Arkema Co. Ltd., average particle diameter: 127 nm, solid content: 49.6% by mass) as the polymer (B-1) was added thereto, and which was then viscosity-adjusted to a coatable viscosity using deionized water while stirring by the rotation-revolution mixer, thereby obtaining a slurry for negative electrodes.

The compounded composition of the slurry for negative electrodes is shown in Table 1.

Fabrication of Negative Electrode

The resulting slurry for negative electrodes was coated on a current collector (copper foil, 19 cm by 25 cm, 18 μm thick) using a doctor blade, and which was then dried in a hot-air circulation-type dryer at 60° C. for 30 minutes and further dried under reduced pressure in a vacuum drier at 80° C. for 12 hours, thereby obtaining a negative electrode where an electrode layer of film thickness 80 μm was formed on the current collector (copper foil).

The resulting positive electrode was measured for peel strength and evaluated for flexibility and battery properties. The results are shown in Table 2.

Example 1-7

A slurry for negative electrodes was prepared similarly to Example 1-6 except that N-vinylacetamide polymer (A2) was used in place of the N-vinylformamide polymer (A1), a negative electrode was fabricated, and various measurements and evaluations were performed.

The compounded composition of the slurry for negative electrodes is shown in Table 1. The results of measurements and evaluations are also shown in Table 2.

Example 1-8

A slurry for negative electrodes was prepared similarly to Example 1-6 except that 8 parts by mass (2 parts by mass as solid content) of acrylic silicone latex (average particle diameter: 166 nm, solid content: 25% by mass) resulting from graft-polymerizing methyl methacrylate to a complex rubber consisting of a butyl acrylate component and a polyorganosiloxane component was used as the polymer (B-1) in place of the polyvinylidene fluoride latex, a negative electrode was fabricated, and various measurements and evaluations were performed.

The compounded composition of the slurry for negative electrodes is shown in Table 1. The results of measurements and evaluations are also shown in Table 2.

Example 1-9

A slurry for negative electrodes was prepared similarly to Example 1-6 except that 27 parts by mass (2 parts by mass as solid content) of polyacrylonitrile latex (average particle diameter: 400 nm, solid content: 7.5% by mass) resulting from dispersing in water a polyacrylonitrile powder obtained by suspension polymerization and forcing it to emulsify by a wet-type atomization apparatus was used as the polymer (B-1) in place of the polyvinylidene fluoride latex, a negative electrode was fabricated, and various measurements and evaluations were performed.

The compounded composition of the slurry for negative electrodes is shown in Table 1. The results of measurements and evaluations are also shown in Table 2.

Comparative Example 1-1

A slurry for positive electrodes was prepared similarly to Example 1-1 except that polyvinylidene fluoride latex was not used, a positive electrode was fabricated, and various measurements and evaluations were performed.

The compounded composition of the slurry for positive electrodes is shown in Table 1. The results of measurements and evaluations are also shown in Table 2.

Comparative Example 1-2

A slurry for positive electrodes was prepared similarly to Example 1-1 except that N-vinylacetamide polymer (A2) was used as the polymer (A) in place of the N-vinylformamide polymer (A1) and polyvinylidene fluoride latex was not used, a positive electrode was fabricated, and various measurements and evaluations were performed.

The compounded composition of the slurry for positive electrodes is shown in Table 1. The results of measurements and evaluations are also shown in Table 2.

Comparative Example 1-3

A slurry for negative electrodes was prepared similarly to Example 1-6 except that polyvinylidene fluoride latex was not used, a negative electrode was fabricated, and various measurements and evaluations were performed.

The compounded composition of the slurry for negative electrodes is shown in Table 1. The results of measurements and evaluations are also shown in Table 2.

Comparative Example 1-4

A slurry for negative electrodes was prepared similarly to Example 1-6 except that N-vinylacetamide polymer (A2) was used as the polymer (A) in place of the N-vinylformamide polymer (A1) and polyvinylidene fluoride latex was not used, a negative electrode was fabricated, and various measurements and evaluations were performed.

The compounded composition of the slurry for negative electrodes is shown in Table 1. The results of measurements and evaluations are also shown in Table 2.

TABLE 1

| | Polymer (A) | | Polymer (B-1) | | Active Material | | Conductive Auxiliary Agent | |
|---|---|---|---|---|---|---|---|---|
| | Type | Amount (part) | Type | Amount (part) | Type | Amount (part) | Type | Amount (part) |
| Example 1-1 | N-Vinylformamide Polymer (A1) | 2 | PVDF-Em | 2 | LCO | 100 | AB | 5 |
| Example 1-2 | N-Vinylformamide Polymer (A1) | 1 | PVDF-Em | 2 | LCO | 100 | AB | 5 |
| Example 1-3 | N-Vinylacetamide Polymer (A2) | 2 | PVDF-Em | 2 | LCO | 100 | AB | 5 |
| Example 1-4 | N-Vinylformamide Polymer (A1) | 2 | Acrylic Silicone | 2 | LCO | 100 | AB | 5 |
| Example 1-5 | N-Vinylformamide Polymer (A1) | 2 | PAN-Em | 2 | LCO | 100 | AB | 5 |
| Example 1-6 | N-Vinylformamide Polymer (A1) | 2 | PVDF-Em | 2 | MPGC16 | 100 | — | — |
| Example 1-7 | N-Vinylacetamide Polymer (A2) | 2 | PVDF-Em | 2 | MPGC16 | 100 | — | — |
| Example 1-8 | N-Vinylformamide Polymer (A1) | 2 | Acrylic Silicone | 2 | MPGC16 | 100 | — | — |
| Example 1-9 | N-Vinylformamide Polymer (A1) | 2 | PAN-Em | 2 | MPGC16 | 100 | — | — |
| Comparative Example 1-1 | N-Vinylformamide Polymer (A1) | 2 | — | — | LCO | 100 | AB | 5 |
| Comparative Example 1-2 | N-Vinylacetamide Polymer (A2) | 2 | — | — | LCO | 100 | AB | 5 |

TABLE 1-continued

| | Polymer (A) | | Polymer (B-1) | | Active Material | | Conductive Auxiliary Agent | |
|---|---|---|---|---|---|---|---|---|
| | Type | Amount (part) | Type | Amount (part) | Type | Amount (part) | Type | Amount (part) |
| Comparative Example 1-3 | N-Vinylformamide Polymer (A1) | 2 | — | — | MPGC16 | 100 | — | — |
| Comparative Example 1-4 | N-Vinylacetamide Polymer (A2) | 2 | — | — | MPGC16 | 100 | — | — |

TABLE 2

| | Electrode | Peel Strength (N/cm) | Flexibility 5 mm | Flexibility 3 mm | Capacity-Maintaining Rate (%) |
|---|---|---|---|---|---|
| Example 1-1 | Positive Electrode | 1.08 | ○ | — | 93 |
| Example 1-2 | Positive Electrode | 0.13 | ○ | — | 92 |
| Example 1-3 | Positive Electrode | 0.50 | ○ | — | 82 |
| Example 1-4 | Positive Electrode | 1.20 | ○ | — | 92 |
| Example 1-5 | Positive Electrode | 1.40 | ○ | — | 93 |
| Example 1-6 | Negative Electrode | 0.12 | — | ○ | 85 |
| Example 1-7 | Negative Electrode | 0.10 | — | ○ | 82 |
| Example 1-8 | Negative Electrode | 0.13 | — | ○ | 80 |
| Example 1-9 | Negative Electrode | 0.20 | — | ○ | 86 |
| Comparative Example 1-1 | Positive Electrode | 0.30 | X | — | 92 |
| Comparative Example 1-2 | Positive Electrode | 0.13 | X | — | 80 |
| Comparative Example 1-3 | Negative Electrode | 0.02 | — | X | 75 |
| Comparative Example 1-4 | Negative Electrode | 0.01 | — | X | 70 |

Here, abbreviated names etc. in Table 1 are as follows. Additionally, in Table 1, "part" is part by mass and amounts of the polymer (A) and the polymer (B-1) are those converted to solid content.

PVDF-Em: polyvinylidene fluoride latex (manufactured by Arkema Co. Ltd., average particle diameter: 127 nm, solid content: 49.6% by mass);

Acrylic Silicone: acrylic silicone latex (average particle diameter: 166 nm, solid content: 25% by mass) obtained in Examples 1 to 4;

PAN-Em: polyacrylonitrile latex (average particle diameter: 400 nm, solid content: 7.5% by mass) obtained in Examples 1 to 5;

LCO: lithium cobalt oxide (manufactured by Nippon Chemical Industrial Co. Ltd., "Cellseed C-5H");

MPGC16: natural graphite-type negative electrode active material (manufactured by Mitsubishi Chemical Co., "MPGC16"); and AB: acetylene black (manufactured by Denki Kagaku Kogyo K.K.).

As evident from Table 2, in the positive electrodes of Examples 1-1 to 1-5 and the negative electrodes of Examples 1-6 to 1-9 which were formed using the polymer (A) and the polymer (B-1), peel strength was high and binding ability of electrode layers to current collectors was excellent. These electrodes were also excellent in flexibility. Furthermore, in the batteries equipped with these electrodes, the battery capacity at the 50th cycle was maintained at least 80% of the battery capacity at the 1st cycle, and thus their battery properties were also excellent.

On the other hand, the positive electrodes of Comparative Examples 1-1 and 1-2 and the negative electrodes of Comparative Examples 1-3 and 1-4 formed without using the polymer (B-1) were inferior in the binding ability and flexibility compared to the positive electrodes obtained in Examples 1-1 to 1-5 and the negative electrodes obtained in Examples 1-6 to 1-9.

Furthermore, the battery equipped with the positive electrode of Comparative Example 1-1 and the battery equipped with the positive electrode of Comparative Example 1-2 were lower in capacity-maintaining rate and poorer in battery properties respectively compared to those of Example 1-1 or 1-5 and Example 1-3. The battery equipped with the negative electrode of Comparative Example 1-3 and the battery equipped with the negative electrode of Comparative Example 1-4 were lower in capacity-maintaining rate and poorer in battery properties respectively compared to those of Example 1-6, 1-8 or 1-9 and Example 1-7.

Test 2

Production of Polymer (A)

N-vinylformamide polymer (A1) was produced similarly to Production Example 1 of Test 1.

Measurement/Evaluation Method

Measurement of Viscosity

An aqueous solution of resin composition was put in a 100 mL screw glass bottle and measured for viscosity using a B-type viscometer (manufactured by Toki Sangyo Co. Ltd., "Model TVB-10M viscometer"). The rotor used was M4 or M2, and the viscosity was read at a revolution speed of 3, 6 or 20 rpm.

Calculation of Viscosity Ratio

Initially, the polymer (A) was dissolved in ion-exchange water so that concentration of the polymer (A) was 1% by mass, thereby obtaining 1% by mass aqueous solution of the polymer (A). The resulting 1% by mass aqueous solution of the polymer (A) was measured for viscosity at 25° C. using the B-type viscometer, and the value was defined as viscosity (α).

Separately, the polymer (A) was dissolved in ion-exchange water so that concentration of the polymer (A) was 1% by mass, thereby obtaining 1% by mass aqueous solution of the polymer (A). 10 parts by mass of the polymer (B-2) was added to the aqueous solution based on 100 parts by mass of the polymer (A). The resulting solution was measured for viscosity similarly to the 1% by mass aqueous solution of the polymer (A), and the value was defined as viscosity (β).

The ratio (β/α) between the viscosity (α) and the viscosity (β) measured by the above-mentioned method was calculated.

Evaluation of Slurry Stability

The resulting slurry for negative electrodes was evaluated for slurry stability by the method below.

A slurry for negative electrodes of examples was allowed to stand for 24 hours, and which was then visually confirmed with respect to occurrence of separation of the slurry, sedimentation of active materials, etc., and the slurry stability was evaluated in accordance with the evaluation criteria below.

Good: no separation or sedimentation; and
Bad: occurrence of separation or sedimentation.

Measurement of Peel Strength

The resulting electrode was measured for peel strength similarly to the method of measuring peel strength of Test 1.

Evaluation of Battery Properties

The resulting electrode was evaluated for battery properties similarly to the method of evaluating battery properties of Test 1.

Example 2-1

Preparation of Resin Composition 2 parts by mass of N-vinylformamide polymer (A1) as the polymer (A), 4 parts by mass (0.2 parts by mass as solid content) of poly(2-sulfo-5-methoxy-1,4-iminophenylene) aqueous solution (solid content: 5% by mass) as the polymer (B-2), and 94 parts by mass of deionized water were weighed and sufficiently dissolved, thereby obtaining an aqueous solution of resin composition.

The resulting aqueous solution of resin composition was measured for viscosity. Here, the rotor used was M4, and the viscosity was read at a revolution speed of 3 rpm. The viscosity ratio was also calculated. The measurement results are shown in Table 3.

Example 2-2

2 parts by mass of N-vinylformamide polymer (A1) as the polymer (A), 1 part by mass (0.2 parts by mass as solid content) of sodium polystyrene sulfonate aqueous solution (manufactured by Tosoh Organic Chemical Co. Ltd., "Porinasu PS-5", solid content: 20% by mass) as the polymer (B-2), and 97 parts by mass of deionized water were weighed and sufficiently dissolved, thereby obtaining an aqueous solution of resin composition.

The resulting aqueous solution of resin composition was measured for viscosity. Here, the rotor used was M4, and the viscosity was read at a revolution speed of 6 rpm. The viscosity ratio was also calculated. The measurement results are shown in Table 3.

Example 2-3

2 parts by mass of N-vinylformamide polymer (A1) as the polymer (A), 5 parts by mass (0.2 part by mass as solid content) of sodium polyacrylate aqueous solution (manufactured by Wako Pure Chemical Industries, Ltd., molecular mass: 1,000,000, solid content: 4% by mass) as the polymer (B-2), and 93 parts by mass of deionized water were weighed and sufficiently dissolved, thereby obtaining an aqueous solution of resin composition.

The resulting aqueous solution of resin composition was measured for viscosity. Here, the rotor used was M4, and the viscosity was read at a revolution speed of 6 rpm. The viscosity ratio was also calculated. The measurement results are shown in Table 3.

Example 2-4

2 parts by mass of N-vinylformamide polymer (A1) as the polymer (A), 5 parts by mass (0.2 parts by mass as solid content) of lithium polyacrylate aqueous solution (manufactured by Wako Pure Chemical Industries, Ltd., molecular mass: 1,000,000, solid content: 4% by mass) as the polymer (B-2), and 93 parts by mass of deionized water were weighed and sufficiently dissolved, thereby obtaining an aqueous solution of resin composition.

The resulting aqueous solution of resin composition was measured for viscosity. Here, the rotor used was M4, and the viscosity was read at a revolution speed of 6 rpm. The viscosity ratio was also calculated. The measurement results are shown in Table 3.

Comparative Example 2-1

2 parts by mass of N-vinylformamide polymer (A1) as the polymer (A) and 98 parts by mass of deionized water were weighed and sufficiently dissolved, thereby obtaining an aqueous solution of resin composition.

The resulting aqueous solution of resin composition was measured for viscosity. Here, the rotor used was M2, and the viscosity was read at a revolution speed of 20 rpm. The measurement results are shown in Table 3.

TABLE 3

| | Polymer (A) | | Polymer (B-2) | | Measurement of Viscosity | | | |
|---|---|---|---|---|---|---|---|---|
| | Type | Amount (part) | Type | Amount (part) | Revolution Speed (rpm) | Rotor No. | Viscosity (Pa · s) | Viscosity Ratio |
| Example 2-1 | N-Vinylformamide Polymer (A1) | 2 | Polyaniline Sulfonic Acid | 0.2 | 3 | M4 | 224.0 | 560 |
| Example 2-2 | N-Vinylformamide Polymer (A1) | 2 | Sodium Polystyrene Sulfonate | 0.2 | 6 | M4 | 66.0 | 165 |
| Example 2-3 | N-Vinylformamide Polymer (A1) | 2 | Sodium Polyacrylate | 0.2 | 6 | M4 | 5.5 | 14 |
| Example 2-4 | N-Vinylformamide Polymer (A1) | 2 | Lithium Polyacrylate | 0.2 | 6 | M4 | 5.0 | 13 |

TABLE 3-continued

| | Polymer (A) | | Polymer (B-2) | | Measurement of Viscosity | | | |
|---|---|---|---|---|---|---|---|---|
| | Type | Amount (part) | Type | Amount (part) | Revolution Speed (rpm) | Rotor No. | Viscosity (Pa · s) | Viscosity Ratio |
| Comparative Example 2-1 | N-Vinylformamide Polymer (A1) | 2 | — | — | 20 | M2 | 0.4 | — |

Here, in Table 3, "part" is part by mass and amounts of the polymer (A) and the polymer (B-2) are those converted to solid content.

Example 2-5

Preparation of Slurry for Negative Electrodes 50 parts by mass (2 parts by mass as solid content) of 4% by mass aqueous solution of N-vinylformamide polymer (A1) as the polymer (A), 4 parts by mass (0.2 part by mass as solid content) of poly(2-sulfo-5-methoxy-1,4-iminophenylene) aqueous solution (solid content: 5% by mass) as the polymer (B-2), and 40 parts by mass of deionized water were weighed into an ointment container, to which then 100 parts by mass of natural graphite-type negative electrode active material (manufactured by Mitsubishi Chemical Co., "MPGC16") was added and kneaded using the rotation-revolution mixer (manufactured by Thinky Co. Ltd., "Awatori Neritaro") under a condition of rotation 1000 rpm and revolution 2000 rpm. After sufficient kneading, it was viscosity-adjusted to a coatable viscosity using deionized water, thereby obtaining a slurry for negative electrodes.

The compounded composition of the slurry for negative electrodes is shown in Table 4. The stability of the resulting slurry for negative electrodes was also evaluated. The evaluation results are shown in Table 5.

Fabrication of Negative Electrode

The resulting slurry for negative electrodes was coated on a current collector (copper foil, 19 cm by 25 cm, 18 μm thick) using a doctor blade, and which was then dried in a hot-air circulation-type dryer at 60° C. for 30 minutes and further dried under reduced pressure in a vacuum drier at 80° C. for 12 hours, thereby obtaining a negative electrode where an electrode layer of film thickness 80 μm was formed on the current collector (copper foil).

The resulting positive electrode was measured for peel strength and evaluated for battery properties. The results are shown in Table 5.

Example 2-6

A slurry for negative electrodes was prepared similarly to Example 2-5 except that 1 part by mass (0.2 part by mass as solid content) of sodium polystyrene sulfonate aqueous solution (manufactured by Tosoh Organic Chemical Co. Ltd., "Porinasu PS-5", solid content: 20% by mass) was used as the polymer (B-2), a negative electrode was fabricated, and various measurements and evaluations were performed.

The compounded composition of the slurry for negative electrodes is shown in Table 4. The results of measurements and evaluations are also shown in Table 5.

Example 2-7

A slurry for negative electrodes was prepared similarly to Example 2-5 except that 5 parts by mass (0.2 part by mass as solid content) of sodium polyacrylate aqueous solution (manufactured by Wako Pure Chemical Industries, Ltd., molecular mass: 1,000,000, solid content: 4% by mass) was used as the polymer (B-2) and 1 part by mass of acetylene black was used as a conductive auxiliary agent, a negative electrode was fabricated, and various measurements and evaluations were performed.

The compounded composition of the slurry for negative electrodes is shown in Table 4. The results of measurements and evaluations are also shown in Table 5.

Example 2-8

A slurry for negative electrodes was prepared similarly to Example 2-5 except that 5 parts by mass (0.2 part by mass as solid content) of lithium polyacrylate aqueous solution (manufactured by Wako Pure Chemical Industries, Ltd., molecular mass: 1,000,000, solid content: 4% by mass) was used as the polymer (B-2) and 1 part by mass of acetylene black was used as a conductive auxiliary agent, a negative electrode was fabricated, and various measurements and evaluations were performed.

The compounded composition of the slurry for negative electrodes is shown in Table 4. The results of measurements and evaluations are also shown in Table 5.

Comparative Example 2-2

A slurry for negative electrodes was prepared similarly to Example 2-5 except that polyaniline sulfonic acid was not used as the polymer (B-2), a negative electrode was fabricated, and various measurements and evaluations were performed.

The compounded composition of the slurry for negative electrodes is shown in Table 4. The results of measurements and evaluations are also shown in Table 5.

TABLE 4

| | Polymer (A) | | Polymer (B-2) | | Active Material | | Conductive Auxiliary Agent | |
|---|---|---|---|---|---|---|---|---|
| | Type | Amount (part) | Type | Amount (part) | Type | Amount (part) | Type | Amount (part) |
| Example 2-5 | N-Vinylformamide Polymer (A1) | 2 | Polyaniline Sulfonic Acid | 0.2 | MPGC16 | 100 | — | — |

TABLE 4-continued

| | Polymer (A) | | Polymer (B-2) | | Active Material | | Conductive Auxiliary Agent | |
|---|---|---|---|---|---|---|---|---|
| | Type | Amount (part) | Type | Amount (part) | Type | Amount (part) | Type | Amount (part) |
| Example 2-6 | N-Vinylformamide Polymer (A1) | 2 | Sodium Polystyrene Sulfonate | 0.2 | MPGC16 | 100 | — | — |
| Example 2-7 | N-Vinylformamide Polymer (A1) | 2 | Sodium Polyacrylate | 0.2 | MPGC16 | 100 | AB | 1 |
| Example 2-8 | N-Vinylformamide Polymer (A1) | 2 | Lithium Polyacrylate | 0.2 | MPGC16 | 100 | AB | 1 |
| Comparative Example 2-2 | N-Vinylformamide Polymer (A1) | 2 | — | — | MPGC16 | 100 | — | — |

TABLE 5

| | Electrode | Slurry Stability | Peel Strength (N/cm) | Capacity-Maintaining Rate (%) |
|---|---|---|---|---|
| Example 2-5 | Negative Electrode | ○ | 0.13 | 85 |
| Example 2-6 | Negative Electrode | ○ | 0.15 | 80 |
| Example 2-7 | Negative Electrode | ○ | 0.18 | 93 |
| Example 2-8 | Negative Electrode | ○ | 0.15 | 92 |
| Comparative Example 2-2 | Negative Electrode | X | 0.02 | 75 |

Here, abbreviated names etc. in Table 4 are as follows. Additionally, in Table 4, "part" is part by mass and amounts of the polymer (A) and the polymer (B-2) are those converted to solid content.

MPGC16: natural graphite-type negative electrode active material (manufactured by Mitsubishi Chemical Co., "MPGC16"); and AB: acetylene black (manufactured by Denki Kagaku Kogyo K.K.).

As evident from Table 3, the viscosities of the aqueous solutions of resin compositions in Examples 2-1 to 2-4 using the polymer (A) and the polymer (B-2) are higher than that in Comparative Example 2-1 using only the polymer (A). The viscosity increase of the aqueous solution also affects the viscosity increase of the slurry for electrodes. Particularly, in the slurry for negative electrodes with no addition of conductive auxiliary agent, viscosity increase of the aqueous solution leads to viscosity increase of the slurry for electrodes, and which tends to result in stability improvement of the slurry for electrodes.

This is also evident from the evaluation results of slurry stability in Table 5. The stability of the slurries for negative electrodes in Examples 2-5 to 2-8 using the polymer (A) and the polymer (B-2) has been improved compared to that in Comparative Example 2-2 not using the polymer (B-2). That is, the slurry for electrodes using the resin composition of the present invention containing the polymer (A) and the polymer (B-2) is excellent in stability.

Additionally, it has been proven that the aqueous solution of the polymer (A) in Comparative Example 2-1 is like a Newtonian fluid of which viscosity is independent of shear velocity when the concentration is about 2% by mass, and it is therefore considered that a viscosity similar to that at 20 rpm will be exhibited as a measured value even when changing the revolution speed to 3 or 6 rpm in the measurement by the B-type viscometer.

As also evident from Table 5, peel strength was higher in the negative electrodes of Examples 2-5 to 2-8 formed using the polymer (A) and the polymer (B-2). Furthermore, in the batteries equipped with these electrodes of Examples 2-5 to 2-8, the battery capacity at the 50th cycle was maintained at least 80% of the battery capacity at the 1st cycle, and thus their battery properties were also excellent.

On the other hand, the negative electrode of Comparative Example 2-2 formed without using the polymer (B-2) had a low peel strength, and the battery equipped with the negative electrode exhibited a lower capacity-maintaining rate and was poorer in battery properties compared to those in Examples 2-5 to 2-8.

Test 3

Production of Polymer (A)

N-vinylformamide polymer (A1) was produced similarly to Production Example 1 of Test 1.

Measurement/Evaluation Method

Evaluation of Slurry Stability

The resulting slurry for negative electrodes was evaluated for slurry stability similarly to the method of evaluating slurry stability in Test 2.

Measurement of Peel Strength

The resulting electrode was measured for peel strength similarly to the method of measuring peel strength of Test 1.

Evaluation of Flexibility

The resulting electrode was evaluated for flexibility similarly to the method of evaluating flexibility of Test 1.

Evaluation of Battery Properties

The resulting electrode was evaluated for battery properties similarly to the method of evaluating battery properties of Test 1.

Example 3-1

Preparation of Slurry for Positive Electrodes 50 parts by mass (2 parts by mass as solid content) of 4% by mass aqueous solution of N-vinylformamide polymer (A1) as the polymer (A), 5 parts by mass (0.2 part by mass as solid content) of sodium polyacrylate aqueous solution (manufactured by Wako Pure Chemical Industries, Ltd., molecular mass: 1,000,000, solid content: 4% by mass) as the polymer (B-2), and 40 parts by mass of deionized water were weighed into an ointment container, to which then 100 parts by mass of lithium cobalt oxide (manufactured by Nippon Chemical Industrial Co. Ltd., "Cellseed C-5H") and 5 parts by mass of acetylene black (manufactured by Denki Kagaku Kogyo K.K.) were added and kneaded using a rotation-revolution mixer (manufactured by Thinky Co. Ltd., "Awatori Neritaro") under a condition of rotation 1000 rpm and revolution 2000 rpm. After sufficient kneading, 4 parts by mass (2 parts by mass as solid content) of polyvinylidene fluoride latex (manufactured by Arkema Co. Ltd., average particle diameter: 127 nm, solid content: 49.6% by mass) as the polymer (B-1) was added thereto, and which was then viscosity-adjusted to a coatable viscosity using deionized water while stirring by the rotation-revolution mixer, thereby obtaining a slurry for positive electrodes.

The compounded composition of the slurry for positive electrodes is shown in Table 6.

Fabrication of Positive Electrode

The resulting slurry for positive electrodes was coated on a current collector (aluminum foil, 19 cm by 25 cm, 20 μm thick) using a doctor blade, and which was then dried in a hot-air circulation-type dryer at 60° C. for 30 minutes and further dried under reduced pressure in a vacuum drier at 80° C. for 12 hours, thereby obtaining a positive electrode where an electrode layer of film thickness 80 μm was formed on the current collector (aluminum foil).

The resulting positive electrode was measured for peel strength and evaluated for flexibility and battery properties. The results are shown in Table 7.

Example 3-2

Preparation of Slurry for Negative Electrodes 50 parts by mass (2 parts by mass as solid content) of 4% by mass aqueous solution of N-vinylformamide polymer (A1) as the polymer (A), 5 parts by mass (0.2 part by mass as solid content) of sodium polyacrylate aqueous solution (manufactured by Wako Pure Chemical Industries, Ltd., molecular mass: 1,000,000, solid content: 4% by mass) as the polymer (B-2), and 40 parts by mass of deionized water were weighed into an ointment container, to which then 100 parts by mass of natural graphite-type negative electrode active material (manufactured by Mitsubishi Chemical Co., "MPGC16") and 1 part by mass of acetylene black (manufactured by Denki Kagaku Kogyo K.K.) were added and kneaded using the rotation-revolution mixer (manufactured by Thinky Co. Ltd., "Awatori Neritaro") under a condition of rotation 1000 rpm and revolution 2000 rpm. After sufficient kneading, 4 parts by mass (2 parts by mass as solid content) of polyvinylidene fluoride latex (manufactured by Arkema Co. Ltd., average particle diameter: 127 nm, solid content: 49.6% by mass) was added thereto as the polymer (B-1), and which was then viscosity-adjusted to a coatable viscosity using deionized water while stirring by the rotation-revolution mixer, thereby obtaining a slurry for negative electrodes.

The compounded composition of the slurry for negative electrodes is shown in Table 6. The stability of the resulting slurry for negative electrodes was also evaluated. The evaluation results are shown in Table 7.

Fabrication of Negative Electrode

The resulting slurry for negative electrodes was coated on a current collector (copper foil, 19 cm by 25 cm, 18 μm thick) using a doctor blade, and which was then dried in a hot-air circulation-type dryer at 60° C. for 30 minutes and further dried under reduced pressure in a vacuum drier at 80° C. for 12 hours, thereby obtaining a negative electrode where an electrode layer of film thickness 80 μm was formed on the current collector (copper foil).

The resulting negative electrode was measured for peel strength and evaluated for flexibility and battery properties. The results are shown in Table 7.

Comparative Example 3-1

A slurry for positive electrodes was prepared similarly to Example 3-1 except that sodium polyacrylate aqueous solution and polyvinylidene fluoride latex were not used, a positive electrode was fabricated, and various measurements and evaluations were performed.

The compounded composition of the slurry for positive electrodes is shown in Table 6. The results of measurements and evaluations are also shown in Table 7.

Comparative Example 3-2

A slurry for negative electrodes was prepared similarly to Example 3-2 except that sodium polyacrylate aqueous solution and polyvinylidene fluoride latex were not used, a negative electrode was fabricated, and various measurements and evaluations were performed.

The compounded composition of the slurry for negative electrodes is shown in Table 6. The results of measurements and evaluations are also shown in Table 7.

TABLE 6

| | Polymer (A) | | Polymer (B-1) | | Polymer (B-2) | | Active Material | | Conductive Auxiliary Agent | |
|---|---|---|---|---|---|---|---|---|---|---|
| | Type | Amount (part) | Type | Amount (part) | Type | Amount (part) | Type | Amount (part) | Type | Amount (part) |
| Example 3-1 | N-Vinylformamide Polymer (A1) | 2 | PVDF-Em | 2 | Sodium Polyacrylate | 0.2 | LC0 | 100 | AB | 5 |
| Example 3-2 | N-Vinylformamide Polymer (A1) | 2 | PVDF-Em | 2 | Sodium Polyacrylate | 0.2 | MPGC16 | 100 | AB | 1 |
| Comparative Example 3-1 | N-Vinylformamide Polymer (A1) | 2 | — | — | — | — | LC0 | 100 | AB | 5 |

TABLE 6-continued

| | Polymer (A) | | Polymer (B-1) | | Polymer (B-2) | | Active Material | | Conductive Auxiliary Agent | |
|---|---|---|---|---|---|---|---|---|---|---|
| | Type | Amount (part) | Type | Amount (part) | Type | Amount (part) | Type | Amount (part) | Type | Amount (part) |
| Comparative Example 3-2 | N-Vinylformamide Polymer (A1) | 2 | — | — | — | — | MPGC16 | 100 | AB | 1 |

TABLE 7

| | Electrode | Slurry Stability | Peel Strength (N/cm) | Flexibility 5 mm | Flexibility 3 mm | Capacity-Maintaining Rate (%) |
|---|---|---|---|---|---|---|
| Example 3-1 | Positive Electrode | — | 1.30 | ○ | — | 92 |
| Example 3-2 | Negative Electrode | ○ | 0.15 | — | ○ | 93 |
| Comparative Example 3-1 | Positive Electrode | — | 0.30 | x | — | 92 |
| Comparative Example 3-2 | Negative Electrode | x | 0.02 | — | x | 75 |

Here, abbreviated names etc. in Table 6 are as follows. Additionally, in Table 6, "part" is part by mass and amounts of the polymer (A), the polymer (B-1) and the polymer (B-2) are those converted to solid content.

PVDF-Em: polyvinylidene fluoride latex (manufactured by Arkema Co. Ltd., average particle diameter: 127 nm, solid content: 49.6% by mass);

LCO: lithium cobalt oxide (manufactured by Nippon Chemical Industrial Co. Ltd., "Cellseed C-5H");

MPGC16: natural graphite-type negative electrode active material (manufactured by Mitsubishi Chemical Co., "MPGC16"); and AB: acetylene black (manufactured by Denki Kagaku Kogyo K.K.).

As evident from Table 7, the binding ability and flexibility in Examples 3-1 and 3-2 using the polymer (A), the polymer (B-1) and the polymer (B-2) were superior to those in Comparative Examples 3-1 and 3-2 using only the polymer (A). The slurry stability in Example 3-2 was also improved even compared to that in Comparative Example 3-2.

Furthermore, in the batteries equipped with the electrodes of Examples 3-1 and 3-2 using the polymer (A), the polymer (B-1) and the polymer (B-2), the battery capacity at the 50th cycle was maintained at least 92% of the battery capacity at the 1st cycle, and their battery properties were also excellent.

On the other hand, the battery equipped with the negative electrode of Comparative Example 3-2 formed without using the polymer (B-1) and the polymer (B-2) exhibited a lower capacity-maintaining rate and was poorer in battery properties compared to those in Example 3-2.

INDUSTRIAL APPLICABILITY

The binder resin composition for secondary battery electrodes in the first embodiment of the present invention allows to form electrodes excellent in flexibility and to obtain batteries excellent in battery properties in particular long-term cycle property and also is excellent in binding ability.

The slurry for secondary battery electrodes in the first embodiment of the present invention is obtained using the binder resin composition for secondary battery electrodes in the first embodiment and allows to form electrodes excellent in flexibility and to obtain batteries excellent in battery properties in particular long-term cycle property.

The electrode for secondary batteries in the first embodiment of the present invention is excellent in flexibility. For this reason, the lithium ion secondary battery equipped with the electrode is excellent in battery properties in particular long-term cycle property.

Furthermore, the binder resin composition for secondary battery electrodes in the second embodiment of the present invention allows to obtain slurries for electrodes excellent in stability even when used for negative electrodes, to form electrodes in which nonuniform distribution of active materials and binders is suppressed, and to obtain batteries excellent in battery properties in particular long-term cycle property.

The slurry for secondary battery electrodes in the second embodiment of the present invention is obtained using the binder resin composition for secondary battery electrodes in the second embodiment and thus is excellent in stability even when used for negative electrodes, consequently allowing to form electrodes in which nonuniform distribution of active materials and binders is suppressed, and to obtain batteries excellent in battery properties in particular long-term cycle property.

The electrode for secondary batteries in the second embodiment of the present invention is less likely to have nonuniform distribution of active materials and binders. For this reason, the lithium ion secondary battery equipped with the electrode is excellent in battery properties in particular long-term cycle property.

The invention claimed is:

1. A binder resin composition for secondary battery electrodes, comprising a N-vinylformamide polymer (A) having a structural unit represented by the general formula (1):

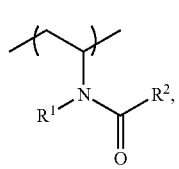

(1)

a water-insoluble particulate polymer (B-1) which is a polymer of fluoride-containing vinyl compounds, and a water-soluble polymer (B-2) which is selected from the group consisting of polyaniline sulfonic acid, sodium polystyrene sulfonate and lithium polyacrylate, wherein the polymer (B-2) has an acidic group and/or a salt thereof, and wherein in the formula (1), $R^1$ and $R^2$ are a hydrogen atom.

2. The binder resin composition for secondary battery electrodes according to claim 1, wherein an average particle diameter of the polymer (B-1) is from 10 to 1000 nm.

3. The binder resin composition for secondary battery electrodes according to claim 1, wherein a mass ratio of the polymer (A) to the polymer (B-1), (polymer (A))/(polymer (B-1)), is from 5/95 to 95/5.

4. The binder resin composition for secondary battery electrodes according to claim 1, wherein an electrode layer undergoes no change in evaluating flexibility of an electrode by the flexibility test below:

(Flexibility Test)

the binder resin composition for secondary battery electrodes and water are kneaded;

an active material is added thereto and kneaded, and a conductive auxiliary agent is further added and kneaded in a case that the electrode is positive, and which is then adjusted to a coatable viscosity with water, thereby obtaining a slurry for electrodes;

the amounts compounded are 2 parts by mass of the binder resin composition for secondary battery electrodes and 5 parts by mass of the conductive auxiliary agent based on 100 parts by mass of the active material;

the resulting slurry for electrodes is coated on a current collector and dried, thereby obtaining an electrode where an electrode layer of film thickness from 20 to 200 µm has been formed on the current collector;

the resulting electrode is cut out into 3 cm wide and 5 cm long to obtain a test piece;

a mandrel of 5 mm diameter is contacted to a current collector-facing surface of the resulting test piece and one side of the test piece is fixed by a tape, then the condition of the electrode layer is observed under an environment of a humidity of 10% or less in the state that the test piece is bent and the current collector-facing surface is positioned inside, thereby evaluating the flexibility of the electrode.

5. The binder resin composition for secondary battery electrodes according to claim 1, wherein the acidic group and/or the salt thereof is at least one selected from the group consisting of carboxyl groups, salts of carboxyl groups, sulfonic acid groups, salts of sulfonic acid groups, phosphoric acid groups and salts of phosphoric acid groups.

6. The binder resin composition for secondary battery electrodes according to claim 1, wherein a mass ratio of the polymer (A) to the polymer (B-2), (polymer (A))/(polymer (B-2)), is from 5/95 to 99.5/0.5.

7. The binder resin composition for secondary battery electrodes according to claim 1, wherein a ratio (β/α) is at least 5, wherein α represents a viscosity of 1% by mass of an aqueous solution (a) of the polymer (A), and wherein β represents a viscosity of an aqueous solution (b), where 10 parts by mass of the polymer (B-2) has been added to the aqueous solution (a) based on 100 parts by mass of the polymer (A) therein.

8. A slurry for secondary battery electrodes, comprising the binder resin composition for secondary battery electrodes according to claim 1, an active material and a solvent.

9. An electrode for secondary batteries, comprising a current collector and an electrode layer provided on the current collector, wherein the electrode layer contains an active material and the binder resin composition for secondary battery electrodes according to claim 1.

10. A lithium ion secondary battery, comprising the electrode for secondary batteries according to claim 9.

11. An electrode for secondary batteries, comprising a current collector and an electrode layer provided on the current collector, wherein the electrode layer is obtained by coating and drying the slurry for secondary battery electrodes according to claim 8 on the current collector.

12. A lithium ion secondary battery, comprising the electrode for secondary batteries according to claim 11.

* * * * *